Oct. 5, 1965 S. W. HOPKINS 3,209,908
HIGH SPEED APPARATUS FOR MEASURING AND SORTING
ELECTRICAL COMPONENTS
Filed March 21, 1963 11 Sheets-Sheet 1

INVENTOR
S.W. HOPKINS
BY 3ER Bergum
ATTORNEY

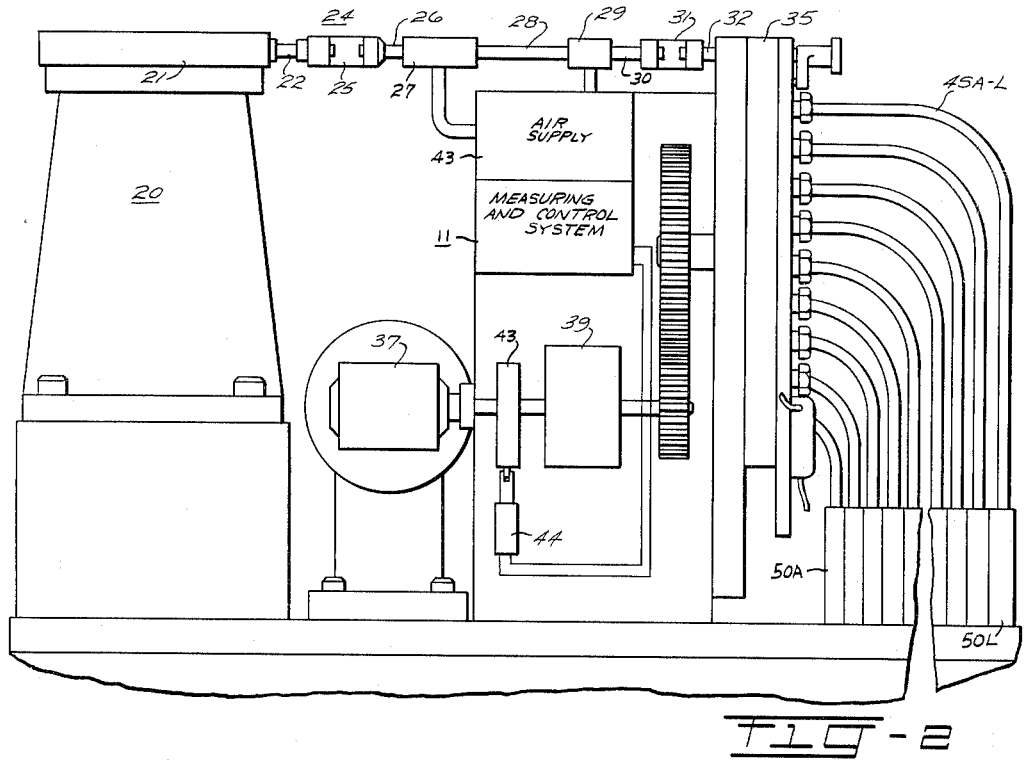
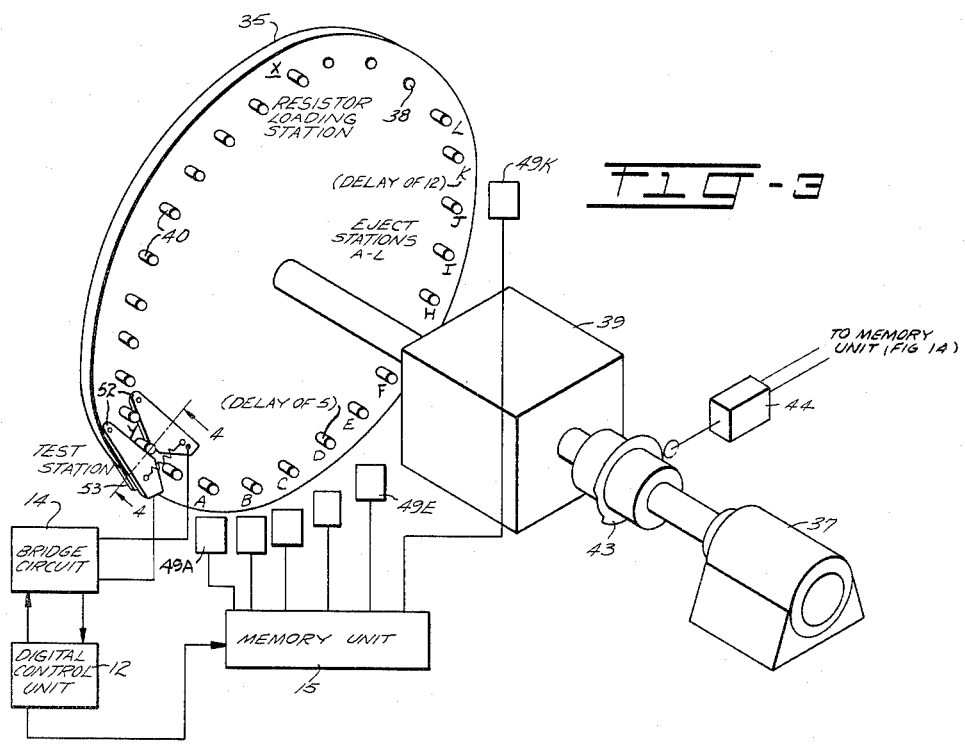

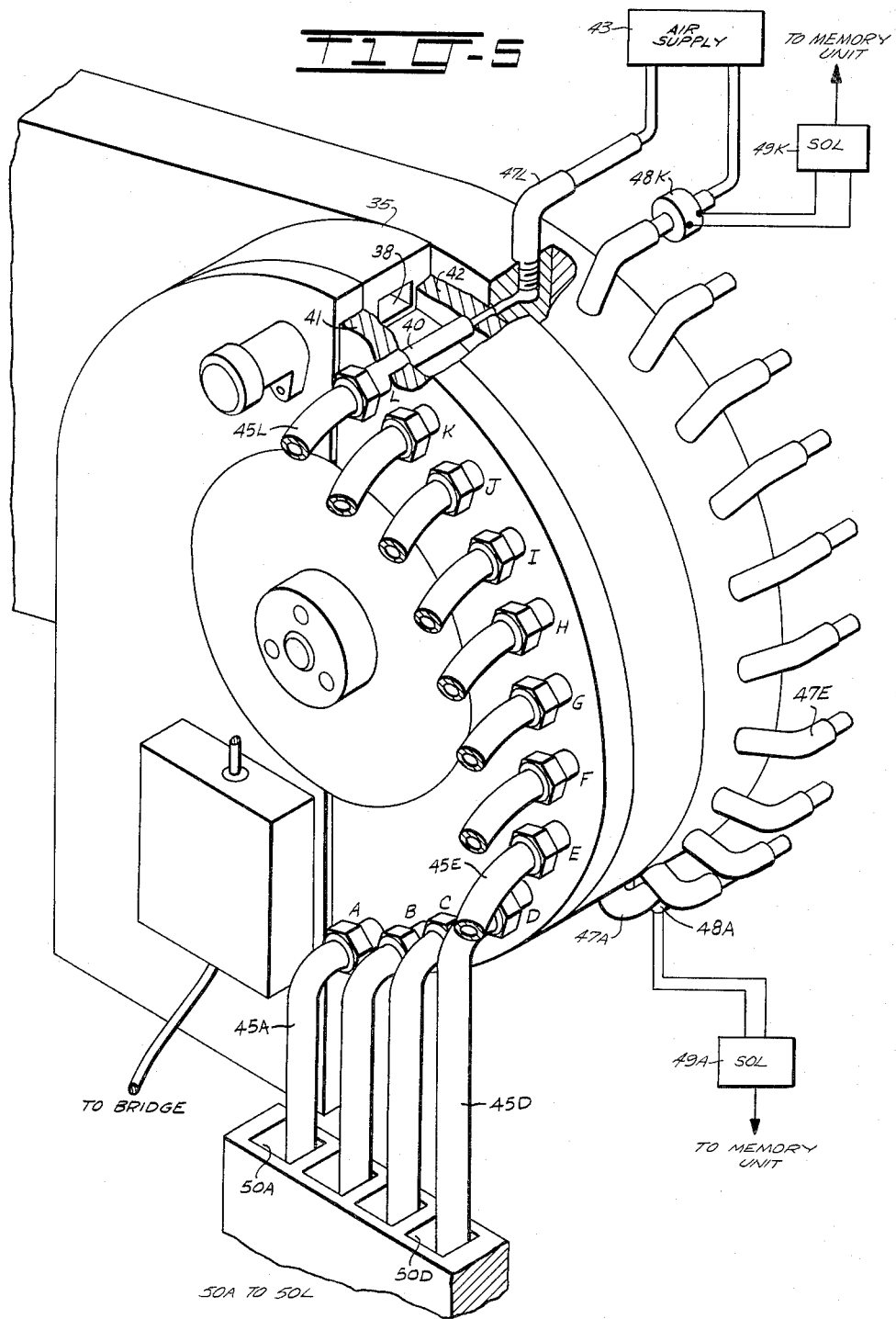

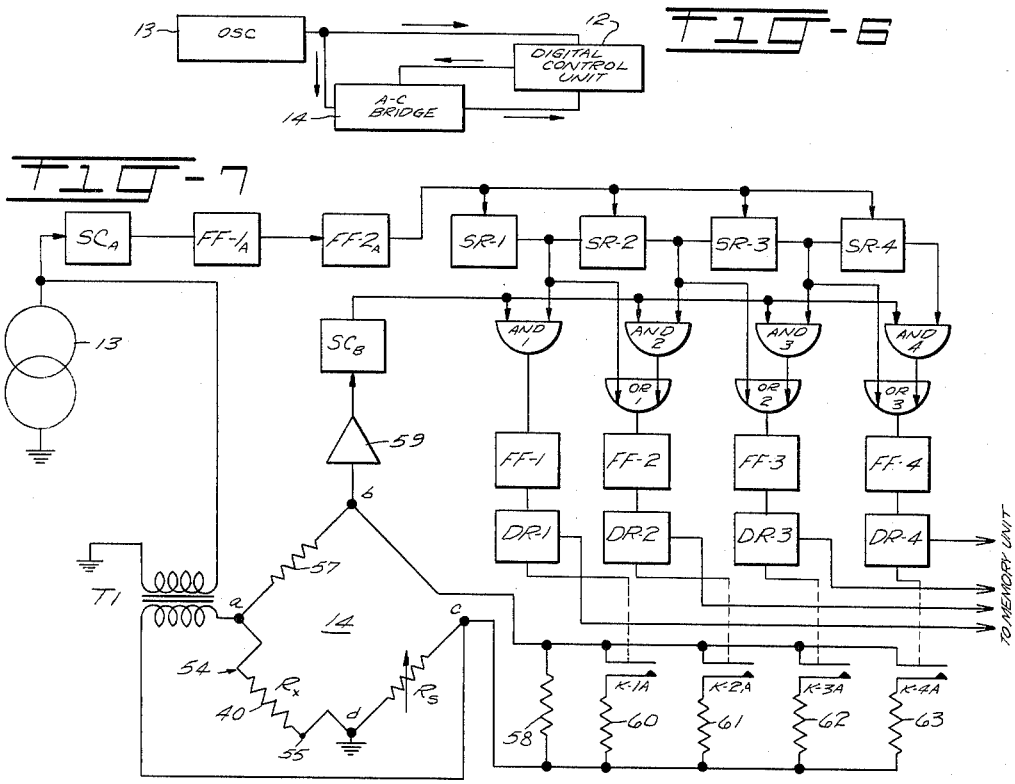
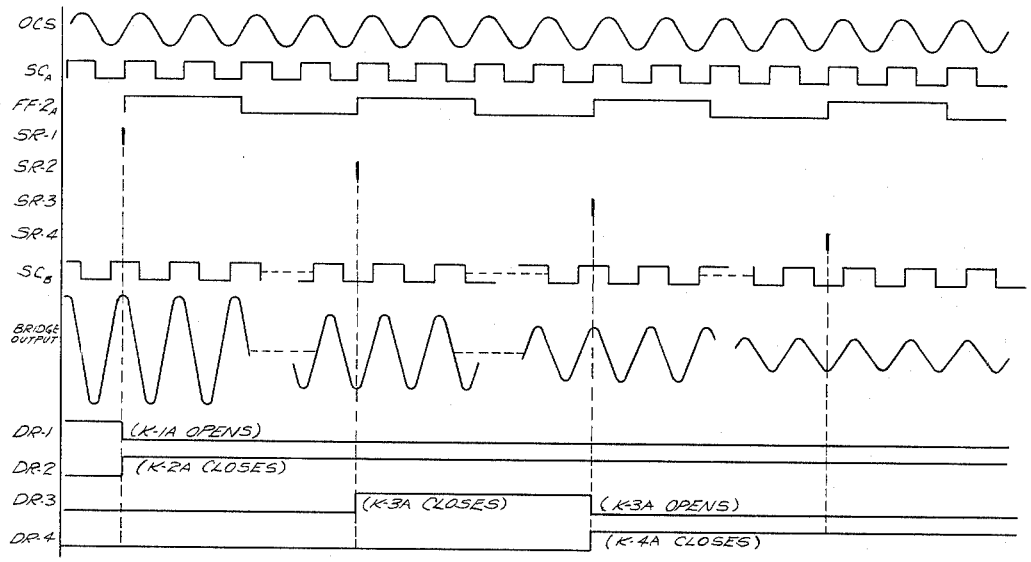

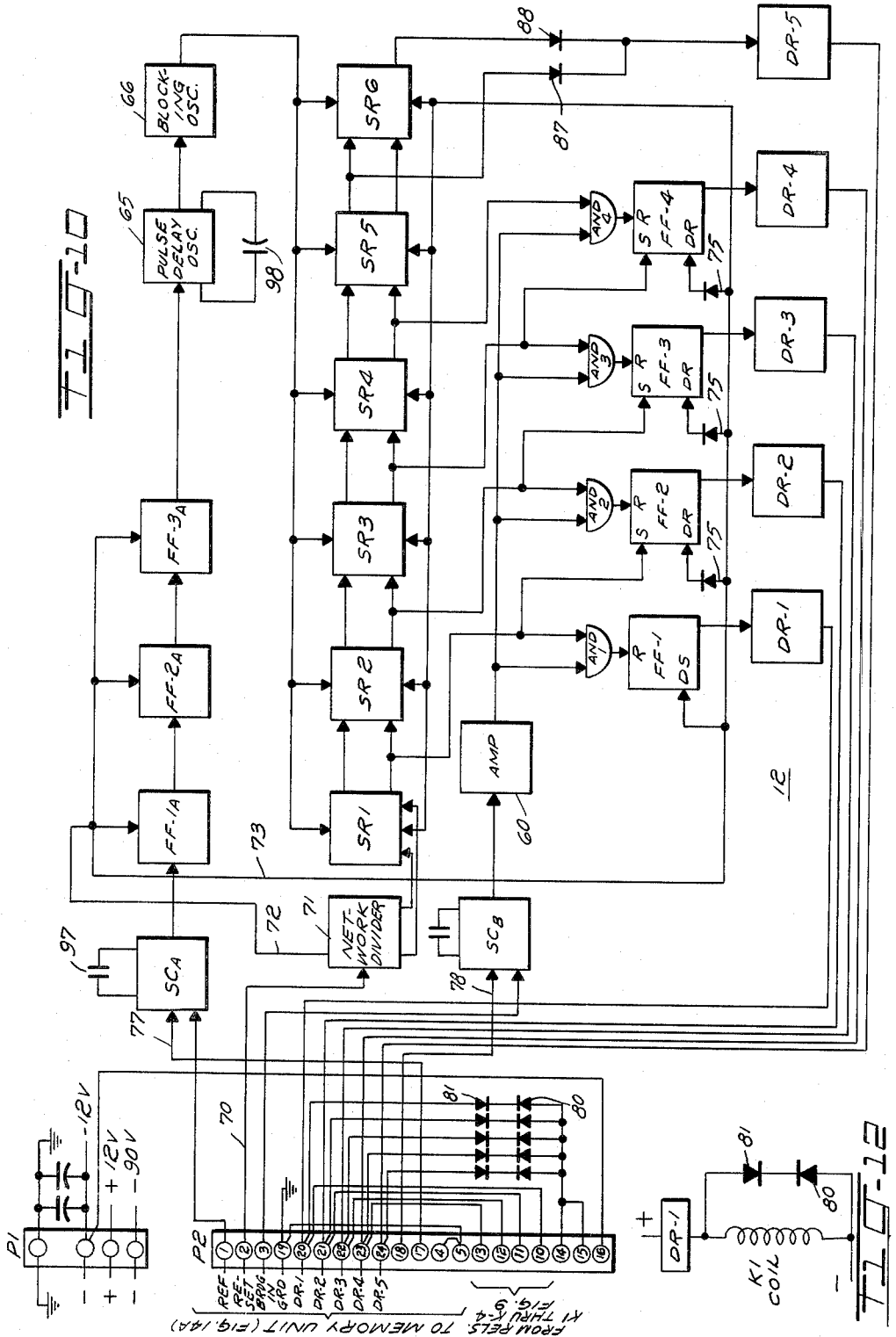

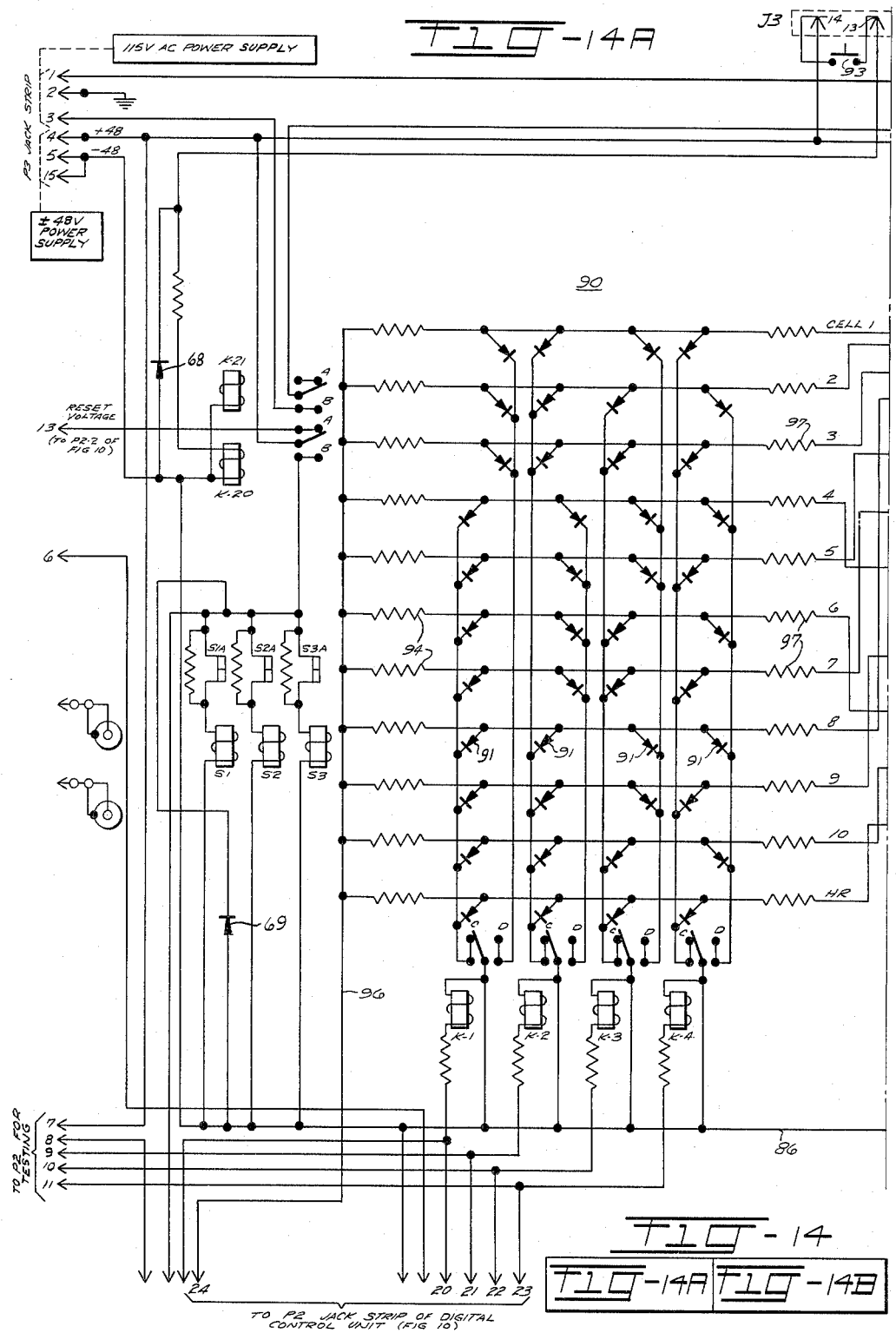

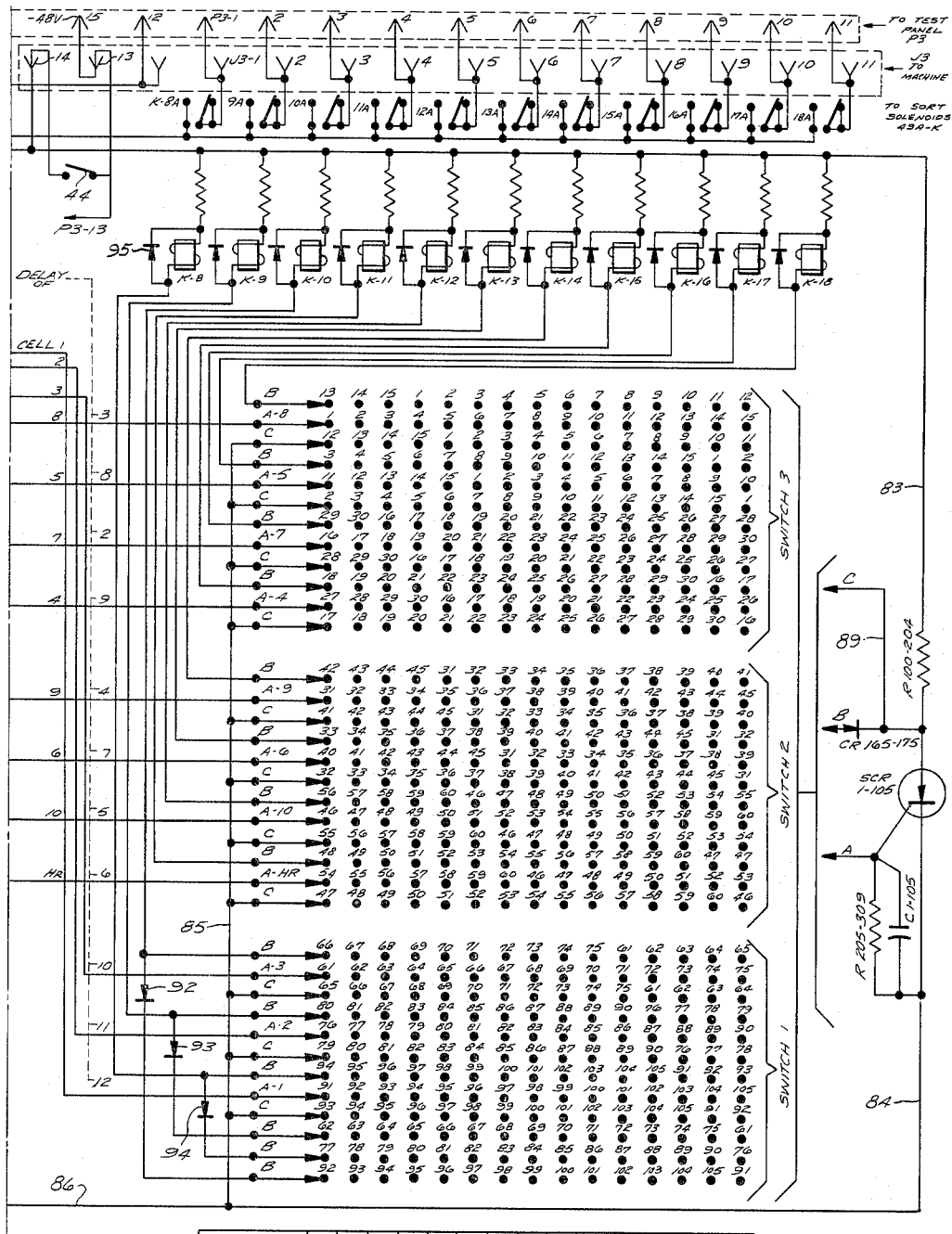

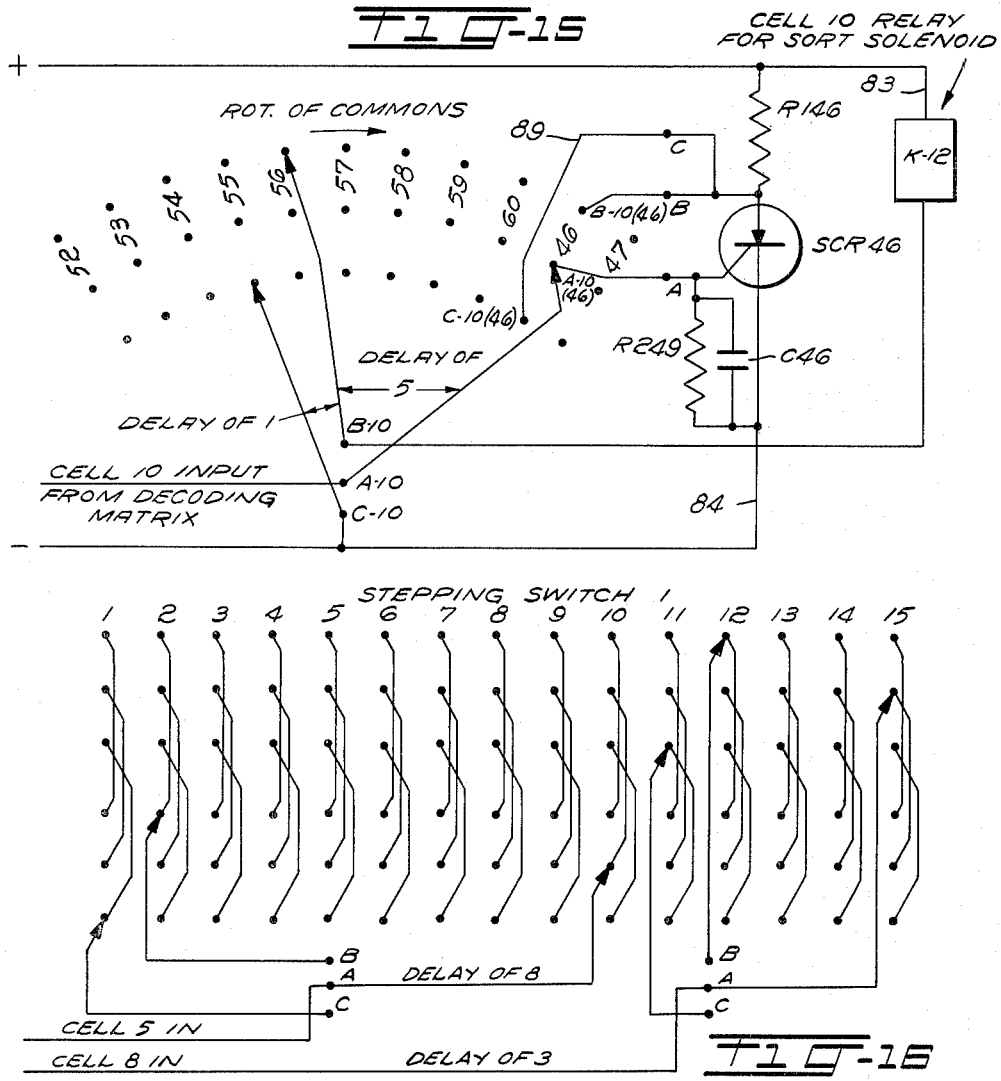

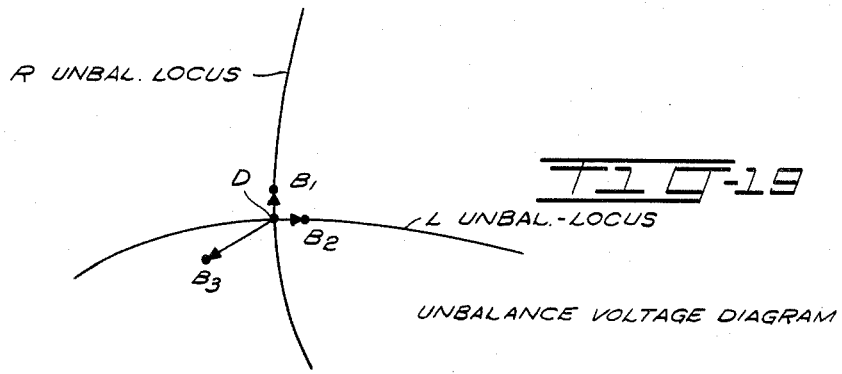
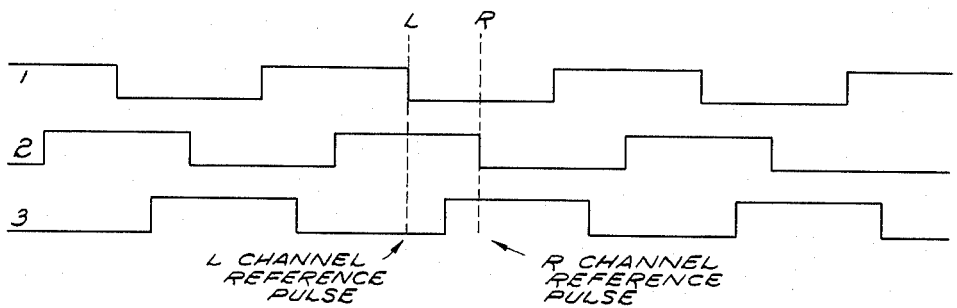
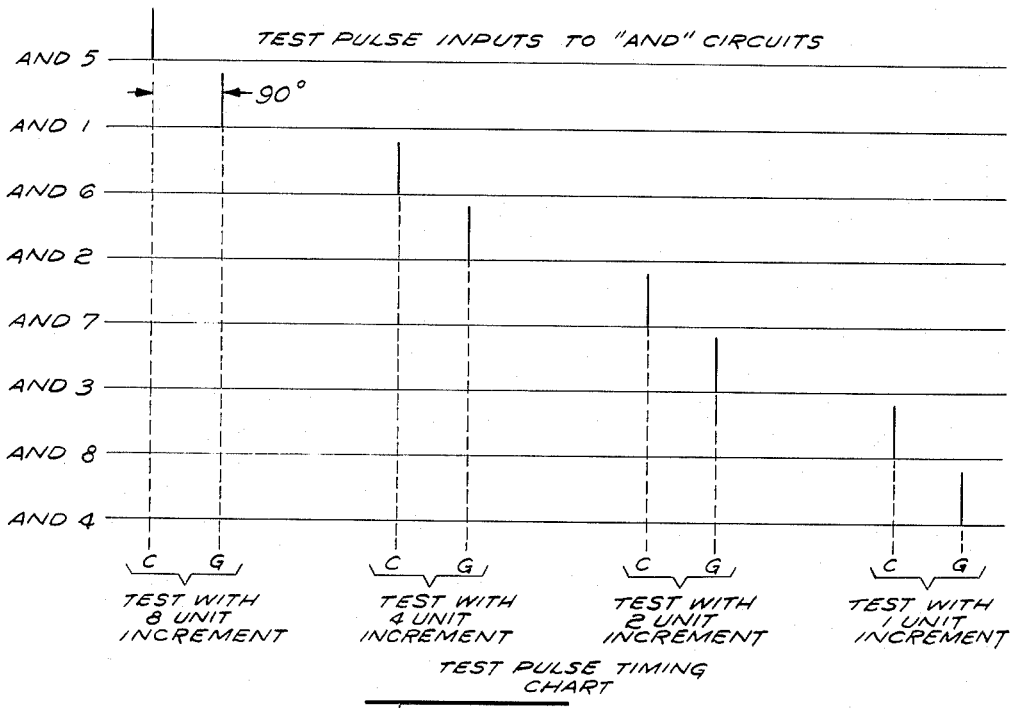

2,209,908
Patented Oct. 5, 1965

3,209,908
HIGH SPEED APPARATUS FOR MEASURING AND SORTING ELECTRICAL COMPONENTS
Stewart W. Hopkins, Haverhill, Mass., assignor to Western Electric Company, Incorporated, New York, N.Y., a corporation of New York
Filed Mar. 21, 1963, Ser. No. 266,902
2 Claims. (Cl. 209—81)

This invention relates to measuring and sorting apparatus and, more particularly, to control circuitry for use therewith.

While the embodiments set forth herein have application in measuring and sorting various types of components, they will be respectively described with reference to preferred applications of measuring and sorting resistors and inductive elements.

In large-scale manufacture of deposited carbon resistors, for example, apparatus is needed for testing preferably all of the resistors to determine within which one of a plurality of resistance categories, having predetermined minimum and maximum limits, each resistor falls.

Such testing is important in that the resistance values of the individual resistors in any one batch tend to vary somewhat about the nominal value from one resistor to the next. This is due to a number of variables which have proven exceedingly difficult to control within close limits at all times during manufacture, such as the application of the thin layer of carbon to the core by the decomposition of hydrocarbon gases, and the cutting of helical grooves in the carbon layer.

Apparatus is also needed for distributing the tested resistors into predetermined bins or receptacles of a group in accordance with the measured values of resistance. It is desirable, of course, that these functions be performed at a very high repetition rate.

Complicating the problems involved in constructing such apparatus is that deposited carbon resistors, for example, are generally very small, a typical size being of the order of ¾ inch in length and ⅛ inch in diameter. Moreover, since the substrate comprises a ceramic core, the resistors are somewhat fragile.

Testing of such resistors has commonly been accomplished heretofore by using an analog measuring and recording device wherein the magnitude of a voltage or a current is measured as a function of the test resistance. Such devices, which may take the form of highly damped volt or amp meters, are generally not conducive to high speed testing applications, are not readily adaptable to actuate sorting apparatus, and leave much to be desired with respect to accuracy.

Another approach has involved the use of a motor driven balancing bridge which usually results in improved measuring accuracy. Servomotors are often employed to drive the bridge standards to balance. While such bridge control is normally quite effective, it has the disadvantage of being relatively slow, due in part to the inertia effects of the servomotors.

An alternative bridge approach involves the use of a series of relays which selectively insert predetermined values of resistance into the standard arm of the bridge until a voltage null, or detection of a change in phase, for example, serves to trigger or to cut-off a control device operating at some threshold voltage. The last operated relay of such a series or chain of relays is then normally detected by suitable means which in turn actuates selecting devices to direct the tested resistor to the appropriate bin.

Detracting from such a measuring system is the fact that the number of relays in the chain of relays generally must equal at least the number of categories or resistance ranges into which the resistors are to be sorted. For example, if ten categories were required, at least ten control relays would have to be successively actuated before a resistor having a resistance falling within the limits of the tenth category could be correctly ascertained and directed into the appropriate bin. As these relays are, of course, electromechanical devices, the speed at which they may be actuated determines to a large extent the overall speed of the testing system.

The sorting apparatus previously used and operated in response to the aforementioned type of relay measuring circuitry is also not conducive to high speed testing operations. More specifically, after each resistor is measured in such an apparatus, it is generally projected by an air stream through a series of blocks or chutes, each being associated with a different sorting bin. A timer circuit associated with the relay testing circuitry is then utilized to determine within which chute, after a predetermined interval of time, dependent on the measured value of resistance, the resistor is diverted from, or stopped and subsequently directed, so as to be deposited in the appropriate bin. Such a sorting system also dictates that the measuring time between successive resistors must be at least as long as the time required for a resistor to traverse through the series of chutes from the first to the last, the number of chutes being equal to the number of categories chosen.

It should be noted that a further limitation on the repetition rate of resistor sorting with prior art apparatus involving mechanically operated chutes or blocks has been due in large part to the fragility of the resistors. Stated another way, the maximum speed at which the resistors could be projected through a series of mechanically operated sorting blocks without being broken seriously limits the sorting repetition rate, especially as the number of categories and, hence, distance of projection increases.

A further disadvantage of all of the aforementioned types of measuring and sorting systems is that they are not versatile to the extent that they may be readily adapted to measure parameters such as inductance or capacitance, as well as resistance.

It is therefore a general object of this invention to provide apparatus and circuitry of unique and improved construction for measuring predetermined electrical parameters of and sorting electrical components into a plurality of discrete categories, each defined by minimum and maximum parameter unit limits.

It is another object of this invention to provide test and control circuitry for measuring an electrical parameter of an electrical component accurately and at high repetition rates, and to automatically actuate with the control circuitry sorting apparatus in a unique and simplified manner.

It is a further specific object of this invention to measure and sort electrical components into a large number of categories with a minimum number of electromechanical devices involved in the testing apparatus and with direct and separate transfer paths for each component after measurement to an appropriate one of a plurality of sorting areas associated with a previously ascertained category.

It is still another object of this invention to measure and sort electrical components into a large number of categories with apparatus and circuitry of the type wherein the number of categories chosen, within a predetermined upper limit, has no appreciable or direct effect on either the repetition rate of measurement or on the repetition rate of sorting.

These and other objects of this invention are attained in one specific illustrative embodiment wherein a digitally controlled bridge circuit is employed for measuring resistors accurately and at a very high repetition rate. As related to resistors, standard predetermined values of conductance in one arm of the bridge are controlled by a plurality of digitally operated control relays. These relays, which number only four in one illustrative embodiment, permit the use of up to sixteen digitally controlled resistance categories into which the resistors may be sorted.

In accordance with another aspect of the invention, the control relays are actuated by signals from a digital control unit comprised of logic elements. This control unit has two signal inputs, one input being supplied with phase variable signal pulses from the bridge output, the other input being supplied with timing signal pulses derived from the bridge energizing signal source. In operation, the bridge measuring circuit output is fed to the control unit which in turn feeds back signals to the bridge to change its internal conductance standards in discrete binary steps until a balance is reached. The final condition of the binary controlled relays determines the resistance bin into which each test resistor will be deposited. As will be discussed in greater detail in connection with the sorting apparatus, a memory unit is supplied with the binary encoded signals from the control unit. The memory unit decodes the binary signals and provides the proper delay of the decoded signal so as to effect the sorting of successively measured resistors at the proper time.

In conjunction with this measuring and control circuitry, unique sorting apparatus is provided wherein the resistors are fed from a supply container, such as a Syntron vibrator, through an air tube, including an air gap (to remove any broken pieces) to a cyclically indexed transfer wheel. This wheel has a plurality of circumferentially disposed bores therein which successively carry the resistors from a load index station adjacent the input feed tube to a test index station where the resistors are successively connected to the test arm of the bridge. Each resistor is then indexed to the proper one of a plurality of eject stations associated with the previously ascertained resistance category.

In accordance with an aspect of the invention, a plurality of sequentially operated, air-controlled output distributing tubes, corresponding in number to the sorting categories minus one, are respectively and successively positioned adjacent the indexing wheel, each at a different eject index station and in alignment with a different bore of the wheel. Each of these distributing tubes, operated by a solenoid-responsive air valve, transfers a resistor ejected therein into the only sorting bin associated therewith. An additional distributing tube, located at the last eject station, is continuously supplied with air to dispose any resistor ejected therein into a low or high reject sorting bin.

In accordance with another aspect of the invention, this selective type of resistor sorting is made possible with the aforementioned memory circuit. This circuit is responsive to the digital control circuit, more particularly, the final settings of the digitally operated bridge relays, and determines which solenoid-actuated air valve associated with a given output distributing tube should be operated to deposit a particular measured resistor into the proper bin. It becomes apparent that in addition to selecting the proper solenoid to be operated, the memory must also store the command signal for that solenoid until the indexing wheel has transferred the particular measured resistor to the appropriate eject station. For example, if there are eleven discrete sorting categories, and the measured resistor falls into the tenth category, the memory circuit must store the measured information and delay the transmission of a control signal to operate the solenoid associated with the tenth air valve and distributing tube until the indexing wheel has at least traversed ten index stations, exclusive of the measuring station. This assumes, of course, that the eleven categories are consecutively arranged to correspond with the first eleven indexing positions. With such a memory and sorting system, it becomes apparent that any combination of measured resistors, up to a number corresponding to the chosen categories, may be ejected from the indexing wheel into different ones of the sorting bins simultaneously.

A very advantageous and important feature of such a sorting system is that a large number of predetermined and digitally controlled sorting categories, up to sixteen for a four-digit binary code arrangement and up to $2^n$ categories for an $n$-digit code, may be utilized with relatively simple, efficient and very reliable control circuitry. An additional non-controlled category may, of course, be utilized for high or low rejects.

Another important advantage of this system is that the speed of sorting is not appreciably affected by the number of sorting categories if less than sixteen for the embodiments depicted herein. Considered more specifically, during the period of dwell of the index wheel, three operations are taking place simultaneously: one resistor is being inserted into a bore at the load station X of the indexing wheel, one resistor is being measured in the bridge circuit, and any resistors that have previously been measured and have reached the proper stations are being ejected from the wheel. Thus, the total stationary period or dwell time of the wheel need be only long enough to allow for one indexing cycle plus the longest of the three aforementioned simultaneous operations which, in this system, is the insertion operation. Hence, the minimum time interval between successive resistance measurements is detected primarily by the time required to insert one resistor into the wheel plus the time to index the wheel one position. As a result, the total time interval between successive measurements may be considerably shorter than that required when time must be allowed during each indexing cycle for a resistor to traverse through a series of mechanically operated chutes, equal in number to the sorting categories, for example.

Especially is this true when the number of resistance sorting categories is more than five or six. By way of non-restrictive example only, a prior mechanically operated sorting arrangement constructed to index and handle resistors at a repetition rate of 10,500 per hour, can adequately sort resistors into four or five categories, whereas the present system, operating at the same repetition rate, can readily sort the same number of resistors into twelve different categories. What is even more important, however, is that this same repetition rate is applicable not only to twelve categories, but to any number of categories up to sixteen for the four-digit binary arrangement embodied herein. It should also be noted that, while the distributing mechanism has been constructed for use with an indexing repetition rate of 10,500 per hour, not only is a considerable increase in this rate possible, but the number of sorting categories could also be increased up to possibly thirty-two sorting categories without affecting the optimum indexing rate of the wheel in accordance with the principles of this invention.

In accordance with another illustrative embodiment of the invention, a digitally operated test set, similar to the one briefly described above, is constructed for use in measuring and sorting components having parameters of both inductance and resistance. The latter test set differs from the former in that both predetermined standard values of resistance and capacitance are connected, in a digital manner, into one of the bridge arms to effect balance. A separate digital control channel is employed for actuating the control relays utilized to insert the predetermined values of capacitance into the bridge circuit. It becomes readily apparent that such a bridge involving both real and reactive balances, may be utilized to test capacitors by simply interchanging the relay-controlled capacitors with appropriately valued inductors.

These and other objects and advantages of the invention will become more fully understood from a consideration of the following description and related accompanying drawings, in which:

FIG. 2 is a front view of a complete test set for feeding resistors to a digitally operated measuring circuit, and thereafter directing the measured resistors to sorting bins, each representative of a discrete sorting category, in response to digital control and memory circuitry in accordance with principles of the present invention;

FIG. 3 is a pictorial representation of the load, test and eject index stations associated with a cyclically indexed transfer wheel, the drive mechanism therefor, together with the digitally operated measuring and control circuitry utilized in conjunction therewith as embodied in the inventon;

Figure 1:
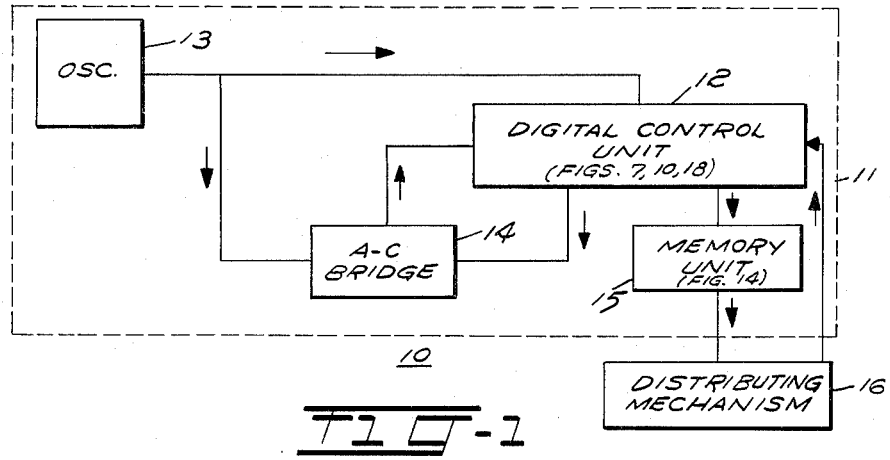
FIG. 1 is a block diagram common to and representative of the basic units employed in combination to measure and sort a series of electrical components into the appropriate one of a plurality of discrete categories, respectively, in accordance with the principles of this invention.
Figure 4:
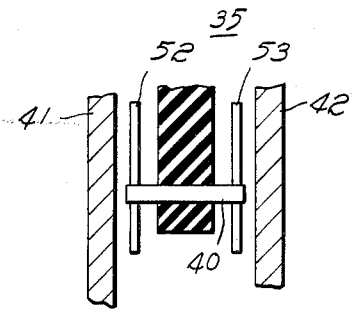
Figure 13:
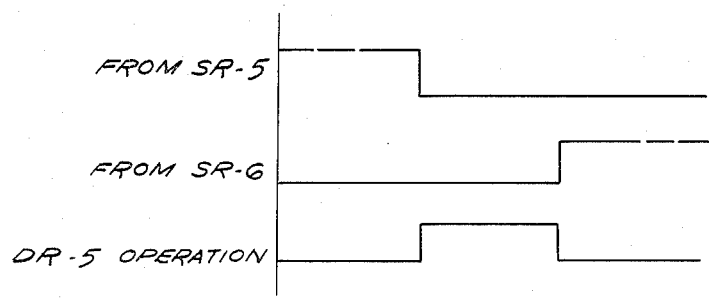
Figure 9:
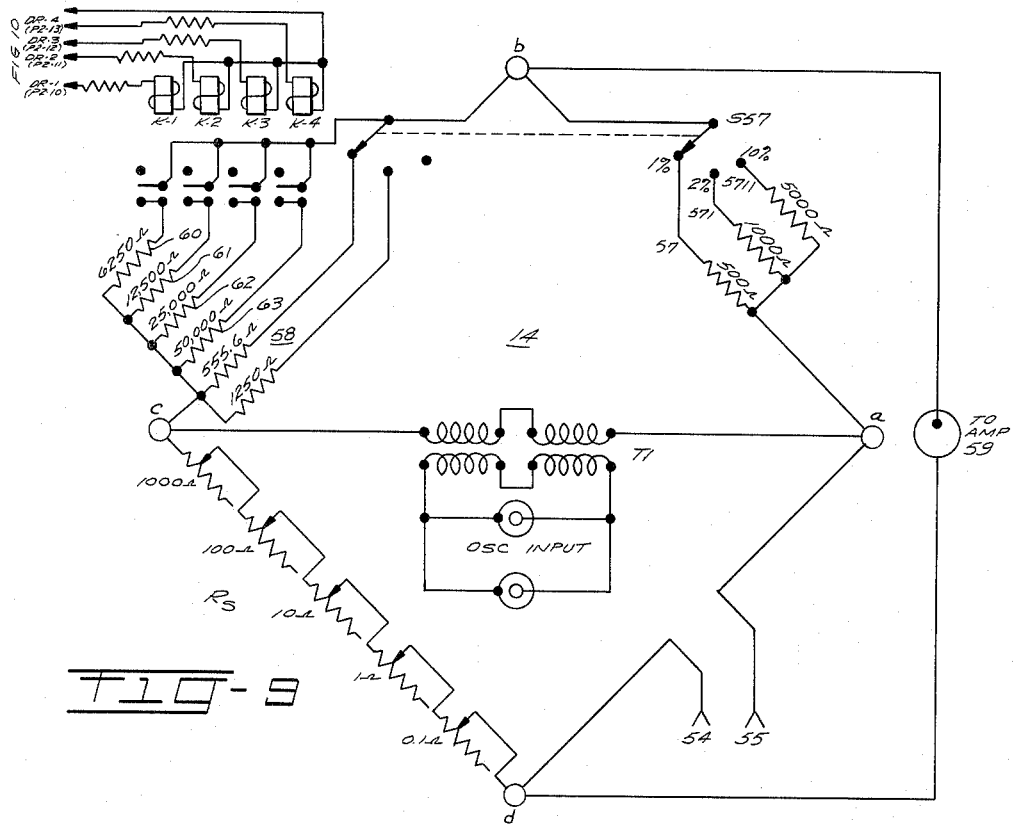
Figure 11:
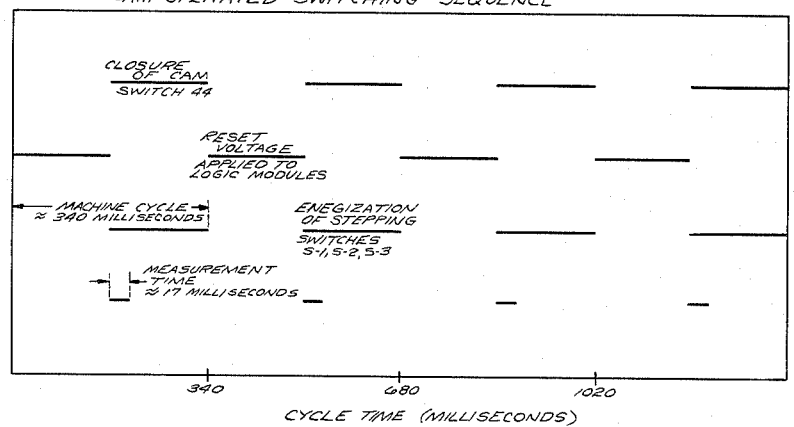
Figure 18:
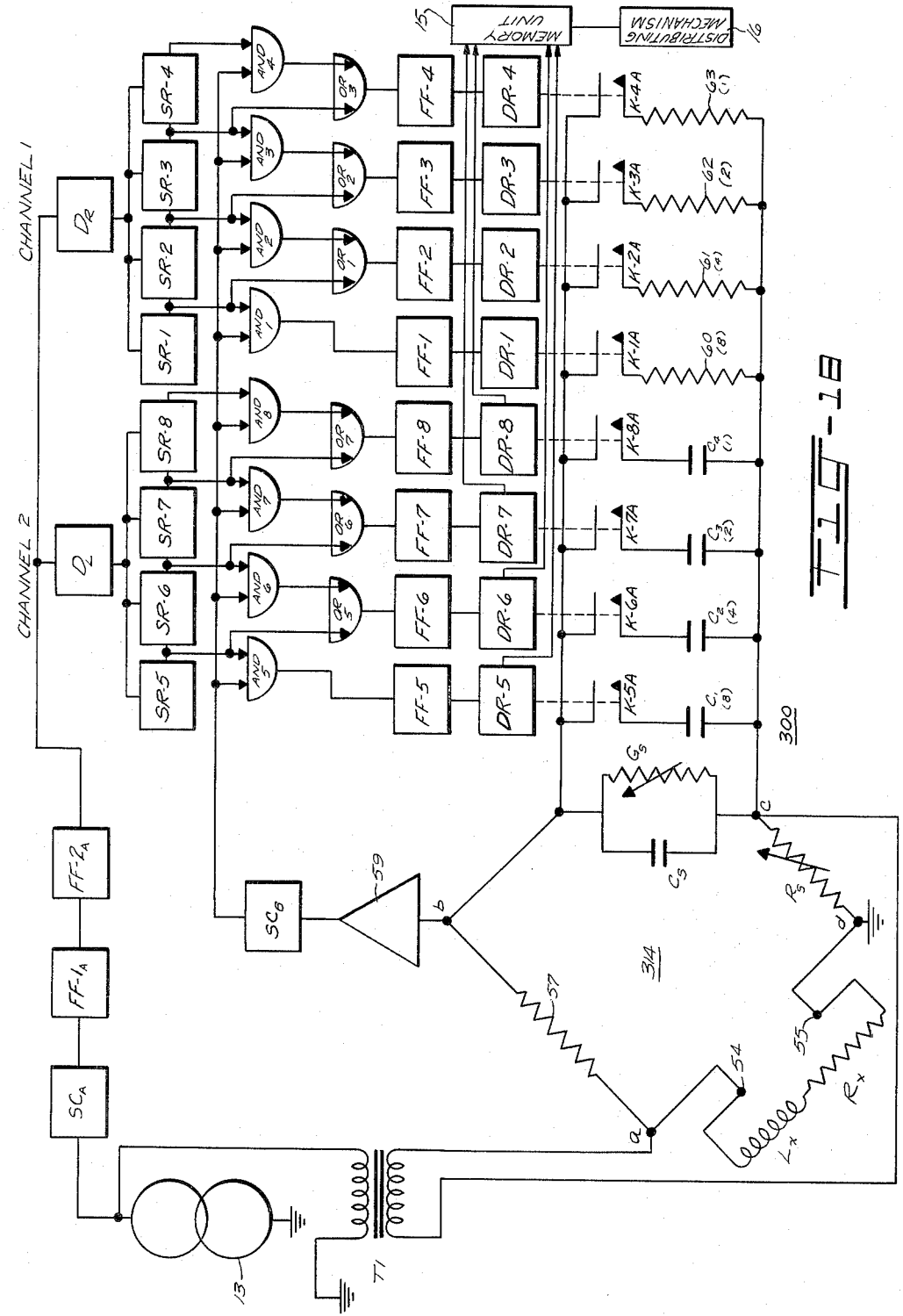

FIG. 4 s an enlarged, fragmentary sectional view taken along the line 4—4 of FIG. 3, and illustrating one resistor stopped in a test position;

FIG. 5 is mainly a perspective view, partially in section, of the indexing wheel, but depicts in block diagram form the digitally operated sorting mechanism associated with the wheel as embodied in the present invention;

FIG. 6 is a simplified block diagram representative of the digitally controlled measuring circuitry in accordance with the illustrative embodiments of this invention;

FIG. 7 is a logic block diagram of a first specific embodiment of the present invention applicable for use in measuring and sorting resistors into a plurality of discrete resistance categories;

FIG. 8 is a timing chart illustrating the operating sequences of the digital control circuitry of FIG. 7;

FIG. 9 is a detail schematic circuit diagram of the measuring bridge circuit depicted in simplified schematic form in FIG. 7;

FIG. 10 is a more detailed schematic diagram, mainly in block diagram form, of the digital control circuitry depicted in FIG. 7;

FIG. 11 is a timing chart illustrating the cam-operated switching sequences for the test set;

FIG. 12 depicts in detail a portion of the digital control unit of FIG. 10;

FIG. 13 is a timing chart illustrating the operating sequences of certain logic modules in the digital control circuit;

FIGS. 14A and 14B, when assembled as indicated in FIG. 14, depict a detailed schematic circuit diagram of the memory unit of the test set of FIG. 1;

FIG. 15 is a partial, schematic representation of the switching circuitry employed in the memory unit of FIGS. 14A and B;

FIG. 16 is a partial schematic circuit diagram of the wiring arrangement for the rotary stepping switches employed in the memory unit of FIG. 14;

FIG. 17 depicts in tabulated form the decoding sequence and periods of delay associated with each binary encoded signal applied to the memory unit of FIGS. 14A and 14B in accordance with the invention;

FIG. 18 is a logic block diagram of a second specific embodiment of the present invention applicable for use in sorting electrical components exhibiting parameters of both resistance and inductance into a plurality of discrete impedance, resistance, or inductance categories;

FIG. 19 is a graphical representation of the measuring bridge output voltage diagram for the test set of FIG. 18, and FIG. 20 is a timing chart illustrating the operating sequences of the digital control circuitry involved in test set of FIG. 18.

Referring now in detail to the drawings and, in particular, to FIG. 1, a block diagram is depicted which illustrates the basic units which together form a unique test set 10 for measuring and sorting electrical components into a plurality of discrete categories in accordance with the principles of this invention. Considered more specifically, the test set includes a digital measuring and control system 11, depicted within the dash-lined box, which comprises a digital control unit 12, an oscillator 13, a bridge measuring circuit 14, and a memory unit 15. These circuits are all common to the several embodiments of the present invention. As depicted in FIG. 1, the memory unit 15 controls a distributing mechanism 16 which first feeds the components to a measuring or test station, and thereafter respectively directs each measured component at the proper time into the appropriate one of a plurality of sorting bins.

The digital control unit 12 has one input connected to the oscillator 13 and a second input connected to the measuring bridge circuit 14. The digital control unit has two main outputs, one connected to the memory unit 15 and the other connected to the bridge through the operation of digitally controlled relays (not shown in this drawing). An unbalanced bridge condition is fed back to the digital control unit in the form of phase-sensitive signals. In response to these signals, the digital control unit in turn feeds back signals to the bridge via the control relays to change the internal standards of the bridge in discrete binary steps until a balanced condition is reached. The final setting of the binary controlled relays determines the proper bin associated with a given category into which the measured component is deposited.

The resistance categories, each having different maximum and minimum limits, may be scaled to have any desired range or percentage change between categories, such as 1 percent or 5 percent steps. By way of example, with a batch of resistors expected to have a mean value of about 110 ohms, using 5 percent steps, a succession of categories starting with 100 ohms may include the following resistance ranges: 100 to 105, 105 to 110.25, 110.25 to 115.76 ohms, etc. In accordance with the principles of this invention, the number of predetermined and digitally controlled resistance categories and associated bins may be readily chosen up to a maximum number of sixteen with no additional control circuitry being involved. In certain applications, it may often be desired to sort the resistors first into broad resistance groups (as by 5 percent steps) and then re-sort each broad group into a second sub-group (as by 1 percent steps). Alternatively, it may be desired to simply sort the resistors into categories separated by consecutive 5 percent intervals, such as 85, 90, 95, 100, 105, 110 percent intervals, for example.

*Over-all test set for measuring, evaluating and sorting resistors*

The complete test set illustrated in FIG. 2 includes a "Syntron" vibratory feed unit designated generally by the numeral 20, having a bowl 21 into which the resistors are placed in a random fashion. The Syntron unit 20 orients the resistors and advances them in a continuous train along an upwardly spiraling track (not shown) formed around the bowl 21 and through an outlet air tube 22 to a sizing gage designated generally by the numeral 24. This gage is provided with a gap 25 through which broken or undersize resistor bodies drop out of the air tube. From the sizing gage 24, the resistors are successively advanced through a delivery tube 26 by an air accelerator 27, which basically comprises a Venturi feed unit, a second delivery tube 28 to a second accelerator 29, a short section of delivery tube 30, a second sizing gage 31, and finally into a delivery tube 32 coupled to the indexing wheel designated generally by the numeral 35. The addition of the second air accelerator 29 provides more effective feeding of the resistors into the indexing wheel 35, and the second sizing gage provides added assurance that broken resistor bodies will not be inserted into the wheel. As thus far described, the feeding mechanism is basically identical to the construction and operation of the corresponding resistor feeding elements disclosed in U.S. Patent 3,017,025, issued January 16, 1962, to William F. Stephen, and assigned to the same common assignee.

The indexing wheel 35 is cyclically rotated through a predetermined angle by an indexing motor 37 and is of a type having a plurality of resistor-receiving seats or bores 38 therethrough, as best seen in FIGS. 3 and 5. For purposes of illustration only, FIG. 3 depicts twenty-six bores equally spaced circumferentially near the outer periphery of the indexing wheel 35. The wheel is preferably of a suitable non-conductive plastic material such as Lucite; however, the wheel may be constructed of either plastic or metal materials.

Each time the wheel is indexed through one step, i.e., a distance equal to the separation between adjacent bores 38, an empty one of the bores is moved into an uppermost loading station designated X in FIG. 3, which is in alignment with the delivery tube 32 depicted in FIG. 2. At that point a resistor 40, depicted in FIG. 3 is forced by the air accelerator 29 into such uppermost bore 38. As best seen in FIG. 4, the wheel 35 is positioned between a pair of non-conducting backing plates 41, 42 so that the resistors are retained within the bores 38 as the wheel 35 is rotated cyclically in a counterclockwise direction. After loading, successive resistors 40 are carried in the bores 38 to a test station located at a position designated Y in FIG. 3, and thereafter carried to a particular one of the unloading or eject stations designated A through L.

As illustrated, the indexing wheel 35 is adapted to sort resistors into eleven discrete, digitally controlled categories corresponding respectively to the unloading or eject stations A through K. A twelfth, non-controlled low reject category is associated with eject station L. As the wheel is cyclically indexed to stop each resistor at the test station Y (which is at least one index position in advance of the first eject station A), the electrical measuring and control system 11, shown within the dash-line box of FIG. 1 and shown generally by the correspondingly numbered box in FIG. 2, operates to determine the resistance category of the resistor under test. This system 11 also stores the digital information for a period of time necessary to effect the ejection of the test resistor from the index wheel at the proper one of eject stations A through K in FIG. 3. The indexing wheel is cyclically rotated through a conventional type of speed reducing Geneva drive mechanism shown pictorially by the box 39 in FIG. 3. A cam designated 43 is mechanically coupled to the shaft of the drive motor. It actuates associated microswitch 44 which is utilized to start the digital test sequence, reset the digital circuits, advance the memory switches and gate the eject solenoids in a manner which will be described in greater detail hereinafter. A typical indexing rate is approximately three per second, however, this rate could be increased considerably if required for a given application.

*Distributing mechanism*

In accordance with an aspect of this invention, the distributing mechanism 16 of FIG. 1 includes in addition to the indexing wheel 35 depicted in FIGS. 2 through 5, a plurality of air-operated, output distributing tubes 45A through 45L, the alphabetical subscripts denoting the corresponding relationship of these tubes with the unloading or eject stations of the indexing wheel depicted in FIG. 3. The distributing tubes are thus seen to be successively and respectively positioned adjacent to and in alignment with a different bore 38 at successive index stations of the wheel 35.

Directly associated with distributing tubes 45A–45L are an equal number of input air tubes 47A–47L, best seen in FIG. 5. Each of these input air tubes, with the exception of tube 47L, is connected through an associated one of air valves 48A–48K, to an air supply which may comprise a typical pump depicted generally by the box 43 associated for purposes of illustration with air tube 47K. The air valves are respectively actuated by correspondingly lettered solenoids 49A through 49K. Input air tube 47L is shown connected directly to the pump 43 as the distributing tube 45L associated therewith directs any resistor ejected therein into a general, low reject bin. Air valves and solenoids are pictorially shown connected only to input lines 47A and 47K in FIG. 5 for purposes of simplicity. It is to be understood, of course, that there are as many air valves and associated solenoids as there are discrete, digitally controlled resistance sorting categories.

Each of solenoids 49A–K is connected to the memory unit 15 of FIG. 1 and responsive to output signals supplied therefrom. The manner in which the solenoids are actuated will be considered in greater detail in connection with a description of the control circuitry hereinbelow.

Preliminary to such a description, however, it is believed that a brief description of the mode of operation of the distributing mechanism 16 at this point will prove helpful in understanding the purposes for and functions of the control circuits embodied herein. When any one of valves 48A through 48K is opened the resistor 40 positioned in the particular bore 38 associated therewith will be ejected from the indexing wheel through the valve-operated one of output distributing tubes 45A through 45K into the associated one of bins 50A through 50K. If the resistor under test does not fall into any of the first eleven discrete categories, it would be ejected into distributing tube 45L and then directed into the low reject bin 50L.

As best seen by the schematic view of FIG. 3, the resistors are successively inserted into the indexing wheel at station X and then transferred to station Y where two pairs of spring-biased contacts 52, 53 (both pairs seen in FIG. 4) electrically connect each test resistor in succession across two terminals in one arm of the bridge circuit 14, shown generally in block diagram form in FIG. 1. The indexing wheel 35 thereafter indexes a number of positions A through L dependent upon the resistance category into which the measured test resistor falls. The memory unit 15, shown in block diagram form in FIG. 1, evaluates and correlates the measured value of resistance for each resistor with respect to time. This is necessary so that the appropriate one of solenoids 49A–49K will actuate the associated air valve at the precise time to eject the test resistor into the proper one of bins 50A–50K.

Considered more specifically, assume that the measured value of resistance of a test resistor 40 falls into category 5, and that the categories numerically correspond to the alphabetically lettered eject stations A through L of the indexing wheel following the test station Y as depicted in FIG. 3. The memory unit which receives the measured value of resistance in digital form from the control unit 12 of FIG. 1, then delays a signal to the solenoid 49E associated with the air valve 48E until the indexing wheel 35 has indexed six stations exclusive of the test position. Six rather than five index cycles are required, since a delay of two is employed to go from test station Y to the first eject station so as to facilitate mounting of the spring contacts 52, 53. The resultant time interval thus represents a delay of six as illustrated in FIG. 3. It becomes readily apparent that if five successively measured resistors fall into the first five categories in inverse order, all five resistors would be ejected from the indexing wheel into output feed tubes 45A through 45E simultaneously.

The time limit between successive measurements is thus dependent primarily upon the speed of resistor insertion into the indexing wheel, and the time required for indexing the wheel only one index position. As such, the distributing mechanism is in no way dependent upon the time required for a given resistor to pass through a series of chutes equal to the number of sorting categories, as required with certain prior art arrangements. In addition, the sorting mechanism is far more simplified than any prior counterparts utilizing electromechanically operated sorting chutes.

*Measuring and digital control units*

FIG. 6 depicts in simplified block diagram form and FIG. 7 in a more detailed logic block diagram, three of the main electrical units of FIG. 1 embodying features of the present invention. Specifically, these units comprise the oscillator 13, the digital control unit 12, and the digitally controlled measuring bridge circuit 14 as embodied herein for use in measuring and sorting resistors into a plurality of discrete categories. The same reference numerals and/or descriptive letters will be used to identify corresponding elements in the various drawings whereever possible.

With particular reference to FIG. 7, the bridge circuit 14 comprises a decade resistance standard $R_s$ serially connected in the $c$–$d$ arm, a standard resistor 57, assumed for purposes of illustration hereinafter as having 100 units of conductance, serially connected in the $a$–$b$ arm, a standard resistor 58, assumed for purposes of illustration hereinafter as having 92 units of conductance, serially connected in the $b$–$c$ arm, and a resistor 40 under test serially connected in the $a$–$d$ arm of the bridge. The terminals 54, 55 in the $a$–$d$ arm are respectively connected to the spring-biased contacts 52, 53 positioned on opposite sides of the indexing wheel 35 at the test station as depicted in FIG. 3.

In accordance with principles of this invention, four relay contacts designated K–1A through K–4A sequentially connect, in a digital binary manner, four conductance standards designated 60 through 63, respectively, across the $b$–$c$ terminals of the bridge.

At balance:

$$\frac{R_{40}}{R_s} = \frac{R_{57}}{R_{(b-c)}} = \frac{G_{(b-c)}}{G_{57}} = \frac{G_{(b-c)}}{100}$$

when $G_{57}$ has 100 units of conductance as assumed above. At balance, $R_{(b-c)}$ may comprise $R_{58}$ shunted by possibly any or all of resistors 60–63. If $R_s$ is set at some given nominal value of resistance then, at bridge balance, the ratio of the test value of resistance to the nominal value will be equal to the total effective value of conductance across the $b$–$c$ arm, divided by 100. If the resistors 60–63 are chosen to have 8, 4, 2 and 1 unit(s) of conductance, respectively, and resistor 58 has 92 units of conductance, then the balancing range of this particular arrangement is for test resistors varying from 92 to 107 percent of the nominal value of resistance. In one illustrative embodiment, the nominal value was adjustable between 1 and 10,000 ohms as established by the setting of the decade resistance $R_s$.

FIG. 9 depicts a more detailed circuit diagram of the bridge circuit 14 of FIG. 7, and illustrates the relationship between the digitally controlled relays K–1 through K–4 and the respective conductance standards 60 through 63 which they selectively connect or disconnect in parallel with resistance standard 58. A cell width switch S–57 is associated with three resistors designated 57, 57' and 57". With the cell switch connected to the 1 percent terminal of $R_{57}$, the bridge balancing range is between 90 and 105 percent of nominal, when connected to the 2 percent terminal of $R_{57'}$, the balancing range is between 80 and 110 percent, and when connected to the 10 percent terminal of $R_{57''}$, the balancing range is between 0 and 150 percent. Representative values for the various resistance standards are shown, by way of example only, as they apply to a specific application of sorting resistors into 1 percent, 2 percent, and 10 percent groupings.

Referring again to FIG. 7, the oscillator 13 provides a signal through a transformer $T_1$ across the bridge terminals $a$–$c$ and it also provides a reference signal through a squaring circuit $SC_A$ and two pulse rate dividers FF–$1_A$, FF–$2_A$, to four shift registers SR–1 through SR–4. The squaring circuit $SC_A$ is of standard design and changes the sine wave from the oscillator 13 into square wave pulses for driving the logic elements incorporated in the digital control unit 12. The frequency dividers FF–$1_A$ and FF–$2_A$ may comprise conventional flip-flop circuits and serve to divide the frequency of the pulses by four in the illustrative embodiment. The shift registers SR–1 through SR–4 are of standard design and respectively provide a series of timing pulses to four associated AND gates designated 1 through 4. Another input to all of the AND gates is provided from a second squaring circuit $SC_B$ driven by an amplifier 59 connected to the bridge output at junction point $b$. The amplifier is of conventional construction and serves to increase the power available from the output of the bridge to operate reliably the logic modules.

Four flip-flop circuits designated FF–1 through FF–4 and four associated drivers designated DR–1 through DR–4 are respectively connected in tandem. Flip-flop FF–1 is connected to AND gate 1, whereas flip-flops FF–2 through FF–4 are connected to OR gates 1 through 3, respectively. The output of the drivers DR–1 through DR–4, when sequentially operated, in turn, operate the associated relay contacts K–1A through K–4A so that predetermined standard values of conductance are inserted in parallel with resistor 58 in the $b$–$c$ arm of the bridge.

The final operate condition of the relay drivers DR–1 through DR–4 is supplied to the test set memory unit 15 of FIG. 1. A more detailed description of the circuitry and function of the memory unit will be given hereinafter.

In order to understand better the purposes and mode of operation of the more detailed circuitry of FIG. 7 to be described below, a brief description of the circuit functions and operating sequences involved therewith will be given at this point. As indicated by the direction of the arrows in FIGS. 6 and 7, the measuring bridge circuit output is fed to the control unit and the control unit in turn feeds back signals to the bridge circuit in a form which changes its internal standards in discrete binary steps until a balance is reached. The final condition of the drivers or control relays therefore determines the resistance group or bin into which the test resistor will be deposited. The bridge balance point is obtained by utilizing the fact that when the $b$–$c$ arm is changed from a below balance to an above balance value, the output from the junction point $b$ shifts phase by 180°.

Starting with a resistor 40 inserted across terminals 54, 55 in the $a$–$d$ arm of the bridge, reset voltage is removed from all shift registers SR–1 through SR–4 and all flip-flops FF–1 through FF–4 in response to a signal controlled by the cam-operated switch 44 of the drive mechanism depicted in FIGS. 2 and 3. In the reset condition, the relay driver DR–1 is energized and relay drivers DR–2 through DR–4 are de-energized so that the K–1A contact is closed and the K–2A through K–4A contacts are initially open. Shift register SR–1 then emits a pulse to the AND–1 gate and to the OR–1 gate. The flip-flop FF–2 then operates causing driver DR–2 to close relay contact K–2A. The flip-flop FF–1 operates and the K–1A contact opens if, and only if, the positive half of the square wave pulse output from the squaring circuit $SC_B$ connected to the bridge output is present at the AND gates at the precise time that the first shift register SR–1 pulse arrives. Shift register SR–2 next emits a pulse to the AND–2 and to the OR–2 gates, causing relay contact K–3A to close in response to the operation of flip-flop FF–3 and the energizing of driver DR–3. Relay contact K–2A opens if, and only if, there is a positive signal level from the squaring circuit $SC_B$ at the precise time that the shift register SR–2 pulse arrives. The shift register SR–3 then emits a pulse to the AND–3 and to the OR–3 gates, causing relay contact K–4A to close. Relay contact K–3A opens if, and only if, there is a positive signal level at the AND gates when the shift register SR–3 pulse arrives. The shift register SR–4 next emits a pulse to the AND–4 gate. This results in relay contact K–4A opening if and only if there is a similar positive signal level from the squaring circuit $SC_B$ when this last pulse occurs. Signal pulses from all of the shift registers then cease so that there is no further operation of the flip-flops FF–1 through FF–4, the relay drivers DR–1 through DR–4, or the bridge relay contacts K–1A through K–4A.

The measured value of resistance of the particular resistor 40 under test is then read into the memory unit and stored for delayed use in effecting the ejection of the measured resistor from the indexing wheel 35 at the proper time. Reset voltages are then supplied to the various logic units of the digital control unit 12 in response to the actuation of cam-operated switch 44 of the distributing mechanism. A more detailed discussion of the reset operations will be given in connection with a description of FIG. 10 hereinbelow. During this same period of time another resistor is supplied to the test station and the cycle is repeated.

The timing chart of FIG. 8 depicts the various voltage relationships which effect the sequential driving of the logic elements of the digital control unit 12 throughout a typical test. In the chart, a positive pulse from the shift register SR–1 is seen to occur simultaneously with a positive pulse from the squaring circuit $SC_B$ to operate both drivers DR–1 and DR–2, thereby opening the initially closed relay contact K–1A and closing the initially open relay contact K–2A. Successive pulses from the shift registers SR–2 through SR–4 ultimately result in drivers DR–2 and DR–4 holding closed the normally open contacts K–2A and K–4A, respectively. Note that the output pulse from shift register SR–2 closes the initially open relay contact K–3A (through the operation of the OR–2 gate, flip-flop FF–3 and driver DR–3), and that the output pulse from shift register SR–3 effects the subsequent opening of contact K–3A. The timing chart thus illustrates how each of the four binary relays K–1A through K–4A, operated by the associated drivers DR–1 through DR–4, close relay contacts K–2A through K–4A in turn, and how these contacts remain in their operated position if the conductance they respectively connect into the b–c arm of the bridge is less than that required for balance. Conversely stated, these contacts selectively drop out only if the conductance respectively associated therewith is more than that required for bridge balance. Contact K–1A, as previously mentioned, is initially closed and only opens if the conductance associated therewith must drop out to establish bridge balance.

The approach of bridge balance is indicated in FIG. 8 by the successive decreases in signal amplitude of the bridge output sine wave until it finally reaches a level corresponding to near zero bridge output.

As further illustrated in FIG. 8, the final binary reading of the relay contacts K–1A through K–4A is read into the memory unit 15 depicted in FIG. 1 as a binary code designated 0101. If resistor $R_S$ is assumed to be 100 units of conductance, resistor 58 across the b–c arm 92 units, and the resistors 60 through 63, 8, 4, 2, and 1 unit(s), respectively, the bridge balances between 92+4+1 and 92+4+2 units of conductance for the binary code of 0101. From this binary reading it is thus known that the resistor under test has a value of resistance between 97 and 98 percent of the nominal setting of the resistance standard $R_S$ in the c–d arm of the bridge in FIG. 7. The "divide by 4" function of flip-flops $FF-1_A$ and $FF-2_A$ as seen in the timing chart is to space precisely the four test pulses emitted from the shift registers SR–1 through SR–4 so that the bridge relays will have time to operate. A typical bridge measuring period in one illustrative embodiment is approximately 17 milliseconds.

FIG. 10 depicts in greater detail the digital control unit associated with the bridge circuits of FIGS. 7 and 9. The same reference numerals and descriptive letters are used to identify elements in FIG. 10 which correspond to those in FIG. 7. A third frequency divider designated $FF-3_A$ is employed in the control unit of FIG. 10 to effect frequency division by a factor of 8 from the squaring circuit $SC_A$ rather than by a factor of 4 as depicted in the more simplified version in FIG. 7. The output from $FF-3_A$ is applied to a pulse delay oscillator 65 which comprises a conventional one-shot multivibrator. This gives the proper phase relationship between the test timing pulses and the bridge unbalance square wave voltage pulses. The pulse delay oscillator is in turn connected to a blocking oscillator 66 which is utilized to sharpen the pulses applied to the various logic modules.

In addition to the four shift registers SR–1 through SR–4 depicted in FIG. 7, two additional shift registers designated SR–5 and SR–6 are also employed in the control unit of FIG. 10 for the sole purpose of providing a timed D.-C. read-in pulse to the memory unit 15 of FIGS. 1 and 14. The two diodes 87, 88 connected to the control input of driver DR–5 function as an AND gate to actuate driver DR–5 and thereby apply a D.-C. voltage of a predetermined level via terminal P2–24 to the memory unit depicted in FIG. 14A. This voltage is applied for a period of time corresponding to the interval between the pulses from SR–5 and SR–6. As a result, this voltage is applied to the memory unit after the drivers DR–1 through DR–4 and the associated relays K–1 through K–4 have reached their final operate conditions at the end of a given measuring period. The final contact positions of the relays are then read into the memory unit from jack terminals designated P2–20 through P2–23. The function of the timing voltage from SR–5 will be considered in greater detail hereinafter in examining the measuring and reset sequences of the logic elements incorporated in the control unit of FIG. 10.

The OR gates 1 through 4, depicted in FIG. 7, actually comprise a part of flip-flop circuits FF–1 through FF–4 in FIG. 10. More specifically, it is seen that an output from each of the first four shift registers, such as from SR–1, is applied not only to the correspondingly numbered AND–1 gate, but is also applied to a set (S) input of the succeeding numbered flip-flop, i.e., FF–2 in this case. Another input is also applied to the flip-flops, FF–1 having a direct set (DS) input and FF–2 through FF–4 having direct reset (DR) inputs. These are all supplied from the memory unit through reset jack terminal P2–2, lead 70, passive network divider 71, and leads 72 and 73. A forward biased diode 75 is serially connected in the direct reset input circuit of each of flip-flops FF–2 through FF–4 to prevent loading of the reset pulses coming from AND gates 2 through 4 via the direct reset lead 73 which is held at a negative voltage level during a test period. The diodes 75 are thus required where the flip-flops have both reset (R) and direct reset (DR) inputs.

With the flip-flop inputs so arranged, FF–1 is always operated to in turn energize the driver DR–1 at the beginning of each test, i.e., prior to the first timing pulse from the shift register SR–1, whereas flip-flops FF–2 through FF–4 are energized only in response to signals from the respective shift registers associated therewith.

Auxiliary inputs 77 and 78 connected to the squaring circuits $SC_A$ and $SC_B$ via jack terminals P2–17 and P2–18, respectively, make possible step-by-step checking of the various logic modules during periods of inspection or to ascertain the location of a malfunctioning module.

In considering the timing sequence for resetting the various modules in the control unit of FIG. 10, reference is made to the timing chart of FIG. 11. Reset voltage to all of the shift registers and flip-flops is effected by a D.-C. voltage level shift under the control of the machine-driven, cam-operated switch 44 depicted in FIGS. 2 and 3. This voltage appears at terminal P2–2 and actually is supplied through the memory unit in a manner described in greater detail hereinafter. This switch has an "on" period and an "off" period for each machine indexing cycle, and provides the only signal going from the machine to the test set as indicated by the connection between the distributing mechanism 16 and the control unit 12 in FIG. 1. As will also be described in greater detail hereinafter, this signal also serves to actuate stepping switches in the memory unit 15 depicted in FIG. 14. The cam-driven switch is initially adjusted so that it closes just after a resistor is positioned under the spring-biased contacts 52, 53 adjacent the indexing wheel as depicted in FIG. 3. At this time, the reset voltage of predetermined level is removed from the digital control unit 12 and bridge balancing commences. At the end of this test period, driver DR-5 applies a D.-C. voltage to terminal 24 which goes to a correspondingly numbered terminal of the memory unit (depicted in FIG. 14A) to actuate control circuitry therein to operate the appropriate sort solenoid associated with the measured category of a particular resistor under test. Thus, the test proceeds, ends, and reads into the memory unit under the complete timing control of the cam-operated switch 44 and oscillator 65 which drives the shift registers.

It is apparent from an examination of the timing chart of FIG. 11 that the operating speed is limited by the distributing mechanism, particularly with respect to the time required to insert a resistor into the indexing wheel and the time required to index the wheel at least once. As depicted, the digitally controlled measuring circuit spends most of the time during each cycle (approximately 323 milliseconds) waiting for another resistor to measure, the latter function requiring only approximately 17 milliseconds out of the total of approximately 340 milliseconds encompassed in each cycle.

FIG. 12 depicts in a partial schematic view how the outputs of the drivers DR-1 through DR-4 are employed to actuate the four relays K-1 through K-4. The relays have not been shown in FIG. 10 in the interest of both simplicity and clarity. Two diodes 80, 81 are serially connected across each of the relay coils, these same diodes being shown in FIG. 10 connected across the appropriate jack terminals. Diode 80 may be of a conventional type and is employed to prevent the inductive kick from the relay load from damaging the associated relay driver when it abruptly stops conducting. Diode 80, by itself, however, severely damps the relay circuit and increases the drop-out time of the relay contact. Accordingly, diode 81 is of the Zener type and functions to limit the reverse voltage to a safe value (this value being dependent on the breakdown voltage of the particular diode employed). This combination of the two diodes thus enables the drop-out time constant to be accurately controlled and insures that the associated driver will be protected from inductive voltage surges in the reverse direction.

In all other respects, the digital control unit as embodied in FIGS. 10 and 12 corresponds to and functions in the same manner as the more simplified arrangement depicted in FIG. 7. That is, the relay drivers are successively energized and the contacts of the associated relays successively closed, but the drivers may or may not be successively de-energized and the contacts of the associated relays may or may not be opened depending upon the phase of the bridge unbalance voltage pulse applied to a given AND gate at the same time as a shift register pulse. The AND gates are thus seen to function as reset inputs to all of the flip-flops.

More specifically, with reference to the timing chart of FIG. 8, the first pulse from shift register SR-1 in FIG. 10 applies a voltage to both the AND-1 gate and to the set (S) input of the flip-flop FF-2. As a result, FF-2 operates and in turn energizes driver DR-2, thereby closing relay contact K-2A. At the same time, FF-1 operates and in turn de-energizes driver DR-1 thereby to open relay contact K-1A only if the positive half of the square wave output from SC$_B$ is applied simultaneously with the SR-1 pulse to the AND-1 gate. This operating sequence, controlled by the precisely spaced shift register pulses, continues until the shaft register SR-4 effects the de-energizing of relay driver DR-4 if contact K-4A applies too much conductance to the bridge to effect balance.

As depicted by the timing chart of FIG. 13, the next succeeding timing pulse from SR-5 then energizes driver DR-5 which applies a positive level of D.-C. voltage to the memory unit 15 (terminal 24 of FIG. 14A) to indicate that bridge balance has been established and to initiate circuitry to operate the appropriate sort solenoid or solenoids. The second timing pulse (initiated from the operation of SR-6) then de-energizes the the driver DR-5 and terminates the positive pulse applied to the memory unit. As previously mentioned, the diodes 87, 88 serve and an "AND" gate so that DR-5 will be energized only during the time between the SR-5 and SR-6 output pulses. The circuitry and mode of operation of the memory unit will now be described in detail.

*Memory unit*

FIGS. 14A and 14B, in combination, depict the electrical circuit elements comprising the memory unit 15 of FIG. 1 as embodied in this invention. The memory unit, as previously mentioned hereinabove, receives a four-digit binary code for each resistor under test and emits an eject signal to the appropriate one of sort solenoids 49A–K which, in turn, operates an associated one of air valves 48A–K, after a predetermined period of delay. The delay is necessary so that each successively measured resistor is ejected from the correct eject station of the indexing wheel 35 (FIGS. 2–5) at the proper time relative to the movement of the wheel.

FIG. 14A depicts a first decoding portion of the memory unit 15 comprising a diode matrix shown generally by the reference numeral 90. This matrix includes eleven banks of switching diodes 91, with each bank comprising four of such diodes. Each bank is associated with a different one of cell lines designated 1 through 10 and HR (high reject) and, as such, represent eleven digitally controlled categories.

It should be noted that there are sixteen (binary 0000 through 1111) discrete categories available with a four-digit binary-operated digital control unit of the type depicted in FIGS. 7 and 10. However, in the illustrative embodiments, the sorting mechanism is constructed to sort into only twelve (1 through 10 plus high and low) reject categories. Only eleven of these categories are coded, 0101 through 1110, and wired into the memory unit 15 of FIGS. 14A and B. Resistors falling outside of these eleven categories are not controlled by a sort solenoid, but rather, are automatically ejected into the twelfth or general low reject bin from the last eject position of the indexing wheel designated L in FIG. 3.

Each of the four diodes 91 in each bank is associated with a different common lead connected to either the C or D contacts of an associated one of relays K-1 through K-4. The relays are actuated in response to signals (representing zeros or plus ones) from the drivers DR-1 through DR-4 of the digital control unit 12 of FIG. 10 through the P2 jack terminals designated 20 through 23, respectively. A plurality of input resistors 94 are respectively connected to the eleven banks of diodes comprising the diode matrix by a common positive lead 96. This lead is connected by jack terminal P2-24 to the driver DR-5 of the digital control unit of FIG. 10. As previously mentioned, it is this signal which signifies the completion of a test measurement, and initiates the start of reading the binary information into the memory unit for decoding in the diode matrix 90. A plurality of resistors 97 are also connected to the outputs of the respective diode matrix banks. Both resistors 94 and 97 are employed to provide the proper operating bias on the switching diodes 91 when a positive signal voltage is supplied over common lead 96.

After the binary encoded information for a given resistor under test is decoded in matrix 90 of FIG. 14A, it is transmitted over one of the cell lines designated 1–10 and HR to the correspondingly identified and associated A terminal of the delay and sorting portion of the memory unit designated generally by the reference numeral 100 in FIG. 14B. The numbered dots arranged in tabulated form and groups to the right of the A terminals represent contact points associated with a particular one of three rotary stepping switches designated as switches 1, 2 and 3. In one specific embodiment, three levels of a twelve-level stepping switch having 15 points per level (four points tied together), and operated with 48 volts was employed.

Arranged as depicted in FIG. 14B, it is seen that cell lines 8, 5, 7 and 4 are respectively connected to cell terminals A–8, A–5, A–7 and A–4 of rotary switch 3, that cell lines 9, 6, 10 and HR are respectively connected to cell terminals A–9, A–6, A–10 and A–HR, or rotary switch 2, and that cell lines 1, 2 and 3 are respectively connected to cell terminals A–1, A–2 and A–3 of rotary switch 1. All of the A terminals associated with each stepping switch are connected to a common contact arm thereof as best seen in FIG. 15. In addition to the cell terminals and associated common contact arms designated A, each of the three stepping switches, as best seen in FIG. 15, also has two additional contact arms designated B and C which are respectively connected to the associated and correspondingly lettered terminals of the memory unit.

These rotary stepping switches are cyclically operated in response to the energization of solenoids designated S–1, S–2, and S–3 in FIG. 14A which, in turn, actuate the associated magnetic contacts S–1A through S–3A, thereby to successively step the rotary switches at the desired time. S–1 through S–3 are energized by a 48-volt source connected through a contact K–20B associated with relay K–20. This relay is energized by the closure of cam-operated switch 44 which completes the 48-volt circuit through terminal P3–4 (FIG. 14A) terminal J3–14 (FIG. 14B), microswitch 44 (FIGS. 2, 3 and 14B), terminal J3–13 to terminal P3–13 (FIG. 14A) via the arrowed interconnection which is in a test panel, not shown. Being under the control of the main drive mechanism, the stepping switches step with precision each time the machine indexes one station.

As depicted by the cam-operated timing chart of FIG. 11, the open period of the microswitch 44 results in the 48-volt supply being applied as reset voltage by contact K–20A and terminal 13 of FIG. 14A to the P2–2 terminal of the digital control unit of FIG. 10. Relay K–21 through its associated contact K–21A serves to gate the sort solenoids 49A–K so that they are operated only during the machine dwell period.

In accordance with the invention, each of the cell terminals A, B and C is connected through successive contact points of the associated stepping switch to a correspondingly lettered input of a succession of silicon controlled rectifiers designated SCR–1 through SCR–105. As thus arranged, there are as many rectifiers (SCR) as there are wired and different numbered contact points on all three stepping switches in combination. Only one rectifier has been depicted in FIG. 14B for purposes of illustration. Resistors R–100–204 are employed for providing the proper anode bias and resistors R–205–309 and capacitors C–1–105 are employed for providing the proper gate bias for the respectively associated control rectifiers SCR–1–105. Diodes CR–165–175 are serially and respectively connected only to the anode inputs designated B of the control rectifiers which are associated with the various numbered contact points at position 15 of the switches.

More specifically, with the type of stepping switch employed, it was possible for a common contact arm to bridge (momentarily) both switch positions 15 and 1 before leaving position 15. This resulted from the fact that there were actually two contact arms spaced 180° apart and transfer from one to the other takes place in going from position 15 to 1. Accordingly, these diodes are employed to prevent false triggering due to possible bridging of contact points when the B common contact arms of the respective switches advance from position 15 to position 1.

As further depicted in FIG. 14B, the anode circuit of each control rectifier is connected through a lead 83 to one common coil end of a plurality of sort relays designated K–8–K–18. The opposite coil ends of these relays are respectively connected to the B terminals of cell lines 1–10 and HR. The cathode circuit of each control rectifier is connected through a lead 84 to a lead 85 common to all of the rectifiers and terminals associated with the cell lines. A common negative lead 86 associated with the diode matrix 90 of FIG. 14A is connected to lead 85 in FIG. 14B.

Considering the wiring of the stepping switches more specifically, reference is made to FIG. 16. As noted above, there are three common contact arms employed for each delay circuit. As the number of delay circuits equal the number of digitally controlled sorting categories, namely eleven in the illustrative embodiment, there are 11×3=33 common contact arms required. The stepping switches illustrated in FIG. 14B have twelve common contact arms per switch; the three switches thus provide a total of 3×12=36 common contact arms. The last three contact arms are all connected to B common terminals of the memory unit and are used only for check-in delays 10, 11 and 12.

As seen from an examination of both FIG. 16, and the chart of FIG. 17, which correlates the coded signals with a particular cell, period of delay and eject station, cell 5, representative of a delay of 8, and cell 8, representative of a delay of 5, use the same set of 15 silicon controlled rectifiers. As a result, any failure of an SCR to extinguish after having been triggered for a delay of eight will appear as an extra sort operation in the delay of three (cell 8) circuit. For checking, a coded signal may be read into the cell 5 circuit, for example, through the actuation of a push button 93 (FIG. 14A) which completes a circuit across P3 terminals 13 and 14. Sort cell 5 should operate each time this is done, but cell 8 should never operate. This insures that all fifteen of the SCR's are triggering properly and extinguishing properly.

An examination of FIG. 14B also reveals that delays of 2 and 9, 4 and 7, and 5 and 6, as pairs, respectively use the same fifteen silicon controlled rectifiers. However, for delays of 10, 11 and 12, there are fifteen SCR's for each delay. More specifically, on the last common contact arm, for example, SCR–92 is contacted one position in advance of the time it is in position to be triggered by the cell 1 input. If it is not properly extinguished at this time, then the cell 3 sort relay will be picked up. Similarly, failure to extinguish any SCR in the cell 2 group will appear as an extra sort relay pickup in cell 1. A similar failure in cell 3 will be indicated in cell 2.

The three diodes 92, 93 and 94 (FIG. 14B) associated respectively with the three B common terminals of stepping switch 1 are employed to isolate the operating circuits from the testing circuits so that false triggering of the silicon controlled rectifiers will not occur.

A more detailed examination of the memory unit 15 of FIGS. 14A and 14B will now be given with reference to a typical mode of operation. If a binary encoded resistance measurement is transmitted from the drivers DR–1 through DR–4 of the digital control unit 12 of FIG. 10, in the form of zero or plus one signal pulses, to the memory unit 15 such that relays K–1, K–2 and K–3 are operated whereas K–4 is not operated, a binary code is established which is read as 1110. Following the actuation of these relays, a positive pulse from driver DR-5 is connected through terminal 24 and common lead 96 to each of the eleven diode switching banks of the matrix 90 depicted in FIG. 14A. With an input code of 1110, it is seen that the positive pulse from lead 96 will be shunted to the common negative lead 86 by one or more diodes in each bank associated with any one of the cell numbers 1–9 and HR. The negative lead 86 is in turn connected to the −48 volt supply associated with the P3–5 jack terminal of the memory unit. Conversely, the positive pulse on lead 96 will not be shunted to the common negative terminal 86 by any diode 91 of the bank associated with cell 10.

The resultant, decoded positive sort signal emanating at the output of the matrix on the line designated cell 10 is then connected to the delay unit of FIG. 14B at the terminal point correspondingly designated A–10. Each terminal A associated with a different cell is connected via a common contact arm A and a given numbered contact point of a particular switch to the gate, or trigger, input similarly designated A of the correspondingly numbered silicon controlled rectifier.

Considered more specifically, with switch 1 in position 1, as shown, terminal A associated with cell 10 is connected to contact point 46 (in the first vertical row of tabulated contact points) via the common contact arm A of switch 1 as best seen in FIG. 15. Contact point 46, which may be further identified as A–10 (46) is in turn connected to the trigger input designated A of the correspondingly numbered silicon controlled rectifier, i.e., SCR–46. After switch 1 (together with switches 2 and 3) is successively advanced five index positions in response to the cyclic energization of solenoids S–1 through S–3, the B terminal of cell 10 is connected to contact B–10 (46) via the common contact arm B. Contact B–10 (46) is in turn connected to the anode terminal input designated B of SCR–46.

After contact arm B reaches contact point B–10 (46), which constitutes a delay of 5, a relay K–12 is energized. The energizing voltage for relay K–12 is provided by the voltage drop developed across resistor R–146 in the anode circuit of rectifier SCR–46 and applied to the relay over lead 83. The energizing of sort relay K–12 in turn supplies the necessary operating voltage via the associated contact K–12A and the associated Jones terminal J3–5 to the sort solenoid 49E not seen, but best understood from an examination of certain of the other illustrated solenoids shown in FIG. 5.

As noted in a discussion of FIG. 3, the first eject position designated A is two index stations away from the test station Y. Accordingly, a delay of 2 corresponds to eject station A, a delay of 6 to eject station E, etc. The chart of FIG. 17 sets forth this information completely in tabulated form. The energizing of solenoid 49E therefore ejects the resistor from the index wheel 35 at the sixth index position after measurement designated E in FIG. 3. The sort relays K–8 through K–18 apply the necessary voltages to the sort solenoids 49A–49K via jack terminal P2–3, relay contact K–21B, and relay contacts K–8A through K–18A, respectively. When the stepping switches advance one more position, i.e., seven in total, it is seen in FIG. 14B that terminal C associated with cell 10 (as well as all of the other C terminals connected in common therewith) is electrically connected to both the cathode and anode of rectifier SCR–46. More specifically, as best seen in FIG. 15, terminal C–10 is connected via lead 84 to the cathode and contact C–10 (46) is connected via lead 89 to the anode input designated C of SCR–46. This effectively provides a short between the cathode and anode of the rectifier which terminates its conduction, i.e., turns it off in preparation for a subsequent test measurement.

It is thus seen from FIG. 15 that as the common contact arms A, B and C rotate clockwise, there is always a predetermined delay (of 5 in the illustration) between the triggering of the silicon controlled rectifier (SCR–46) effected by arm A and the detection of the conducting position through arm B so as to effect the energization of the sort relay (K–12). Then after an added delay of one, the arm C short-circuits the SCR to extinguish it.

*Test set for measuring and sorting inductors*

The above-described test set has been constructed for and described only as it relates to the measuring and sorting of resistors exhibiting pure resistance. For such an application, all unbalance bridge voltages are exactly in phase or 180° out of phase with the bridge excitation voltage.

FIG. 18 depicts a second specific illustrative embodiment of this invention applicable for use in measuring and sorting electrical components exhibiting values of both inductance and resistance, such as inductors. In making reactance or impedance measurements of such components, the phase of the bridge unbalance voltage may encompass the entire range from 0 to 360°. Accordingly, both the in-phase and quadrature components must be balanced out. This is accomplished in the test set designated generally by the reference numeral 300, depicted primarily in block diagram form, in FIG. 18. Certain of the circuit elements and all of the logic modules associated with the logic channel designated 1 of this test set which correspond to those in FIG. 7 will be identified by like reference numerals and/or descriptive letters.

Distinguishing from the bridge circuit 14 of FIG. 7, bridge circuit 314 includes both a capacitance standard $C_S$ and a conductance standard $G_S$ that are controlled by a plurality of high speed reed relays designated K–5 through K–8 and K–1 through K–4, respectively. An oscillator 13 provides a signal through a transformer T–1 across the bridge terminals *a-c* and also provides a reference signal through a squaring circuit $SC_A$ and pulse rate dividers $FF-1_A$ and $FF-2_A$ to two sets of shift registers SR–1 through SR–4 and SR–5 through SR–8, associated with channels designated 1 and 2, respectively. A pulse delay circuit designated $D_R$ and a similar circuit designated $D_L$ apply pulse signal voltages to logic channels 1 and 2, respectively. The pulse delay circuits preferably comprise conventional one-shot multivibrators arranged to give the proper pulse delay to the associated logic channels.

In addition to the shift registers SR–5 through SR–8, the second logic channel comprises four AND gates designated AND–5 through AND–8 respectively connected to the output of the correspondingly numbered shift registers. Another input to all of these AND gates (as well as AND gates 1–4), is provided from squaring circuit $SC_B$ driven by an amplifier 59 connected to the bridge output at junction point *b*. Four flip-flop circuits designated FF–5 through FF–8 and four associated drivers designated DR–5 through DR–8 are respectively connected in tandem and complete the essential logic units of the second digitally controlled, inductive measuring channel.

As in the first channel, previously described in connection with FIG. 7, the flip-flop FF–5 is connected to and AND–5 gate whereas flip-flops FF–6 through FF–8 are connected to OR–5 through OR–7 gates, respectively. The outputs of all of the drivers, namely DR–1 through DR–8, when sequentially operated, in turn sequentially operate the relays of contacts designated K–1A through K–8A so that predetermined standard values of both capacitance and conductance are connected in parallel with capacitor $C_S$ and resistor $G_S$ in the *b-c* arm of the bridge. The final settings of relay contacts K–5 through K–8 are transmitted to a memory unit 15 which may be similar to the one for measuring and sorting resistors depicted in FIGS. 14A and B.

It should be noted that this specific embodiment is intended only to measure and sort reactances and, in particular, inductors. A resistance logic channel is required, however, since to obtain an accurate bridge balance of a reactance parameter, it is necessary to balance out the resitsance parameter associated therewith. Consequently, only the outputs from the relay drivers associated with the capacitance standards, i.e., those designated DR–5 through DR–8, are transmitted to the memory unit. In all other respects, the measuring, digital control, and memory units of FIG. 18 are constructed and function in the same manner as set forth for the resistance measuring counterparts.

Considering briefly the interrelationship between the resistance and inductance of an inductor under test, assume that a test inductor having some value of inductance $L_X$ in series with a resistance $R_x$ is connected across terminals 54, 55 of the bridge 314. It is to be understood that these terminals are connected to the spring-biased contacts of or similar to those associated with the indexing wheel 35 as depicted in FIG. 3.

At balance:
$$L_x = R_{57} R_S C_{b-c}$$
and
$$R_X = R_{57} R_S G_{b-c}$$

where $C_{b-c}$ is equal to $C_S$ plus the incremental values of capacitance connected in parallel therewith through the operation of relay contacts K–5A through K–8A, and where $G_{b-c}$ is equal to the standard conductance $G_S$ plus the incremental values of conductance connected in parallel therewith through the operation of relay contacts K–1A through K–4A.

The capacitance standard $C_S$ is adjusted so that the balance point for the unknown value of inductance $L_X$ falls within the range of the four digitally controlled standard capacitance increments represented by capacitors $C_1$ through $C_4$. The standard value of conductance $G_S$ is then adjusted so that the balance point for the unknown value of resistance $R_s$ falls within the range of the four digitally controlled standard conductance increments represented by resistors 60 through 63.

Adjusted in this manner, the binary related and graduated standard incremental values of capacitance and conductance may be chosen so as to effect final bridge balance to within one unit. Moreover, as illustrated, the bridge will have a digitally controlled balancing range of $2_n$ units, where $n$ is the number of increments used. In the illustrative embodiment, $n$ equals 4 as there are four graduated standard increments of capacitance and conductance, respectively. If these increments associated with each channel are subdivided into 8, 4, 2 and 1 unit increments as shown, then there are $2^4$ or 16 possible relay controlled standard capacitance units and 16 relay controlled standard conductance units. In this connection, it should be noted that there could be as many as $2^n \times 2^n$ sorting bins for all real and reactive sorting combinations, or certain combinations of L and R could be coded, but to give a sort by impedance in accordance with the invention. Similarly, it becomes readily apparent that the standard capacitors in FIG. 18 could be replaced with inductors so that components exhibiting capacitance rather than inductance could be measured and sorted in accordance with the principles of this invention.

The specific sequence in which the digitally controlled relays K–1 through K–8 are successively operated to balance the bridge is fully set forth above with reference to the resistance channel of FIG. 7. As such, the mode of operation of both logic channels of the digital control unit depicted in FIG. 18 will be described only in connection with an examination of the unbalance voltage diagram and timing charts of FIGS. 19 and 20, respectively.

FIG. 19 illustrates a vector diagram of the unbalance voltage which exists across the $b-d$ points of the bridge 314. Points B1, B2 and B3 in the diagram represent the voltage levels at the $b$ junction of the bridge with three different combinations of standard capacitance and conductance increments successively connected into the $b-c$ bridge arm. As depicted, the locus of the $d$ to $b$ bridge arm voltage resulting from an inductance unbalance is perpendicular to the locus of the voltage resulting from a resistance unbalance. Accordingly, the capacitance increments associated with relays K–5 through K–8 (to control inductance unbalance) and the conductance increments associated with relays K–1 through K–4 (to control resistance unbalance) operate from two different sets of reference pulses that are separated from each other by ¼ of the period of the test signal. This is accomplished by adjusting the pulse delay circuit $D_R$ so that its output pulse occurs ¼ cycle after the pulse emitted from the pulse delay circuit $D_L$ in FIG. 18.

The timing chart of FIG. 20 illustrates the sequence of pulses emitted from shift registers SR–1 through SR–8 to the respectively associated AND circuits in FIG. 18. As previously described, the square wave pulses from the shift registers may be either in phase or out of phase with the bridge output voltage, depending upon the direction of bridge unbalance. As illustrated, standard capacitance C increments and standard conductance G increments are alternately and successively inserted into the $b-c$ bridge arm through the selection actuation of the relay contacts associated with the vertically listed AND gates, but these increments are removed if their addition causes the positive level of the bridge output wave through squaring circuit $SC_B$ to be present simultaneously with a shift register pulse applied at the input of any one of the AND gates with the exception of gates 1 and 5. The relay contacts K–1A and K–5A associated with the latter gates are normally closed at the start of a measuring cycle, hence, the actuation of either of these AND gates would only remove the particular parameter increments associated therewith from the bridge circuit. In this manner, both the reactive and resistive parameters of the test element are balanced out, and at the end of the test the measured value of inductance in binary form is read into the memory unit, the reading representing the final operating condition of relay drivers DR–5 through DR–8.

It is to be understood that the specific embodiments described herein are merely illustrative of the general principles of the present invention. Various other arrangements and modifications may be devised in the light of this disclosure by one skilled in the art without departing from the spirit and scope of this invention.

What is claimed is:

1. In combination, apparatus for measuring and sorting electrical components exhibiting different unit values of a predetermined parameter into the appropriate one of a plurality of discrete categories, each defined by different maximum and minimum parameter unit limits, said apparatus comprising:

a measuring circuit including a voltage balancing A-C bridge, means for energizing said bridge, digital control means for selectively inserting at least one of a plurality of predetermined increments each having a different number of the parameter units being measured into one arm of said bridge to balance out the number of parameter units exhibited by the component under test, means included in said digital control means for translating the measured number of parameter units exhibited by said component under test into a binary code, memory means connected to said digital control means and responsive to said binary code, said memory means including means to decode and then delay the subsequent use of said decoded information, the period of said delay being dependent upon the category defined by said binary code, and means responsive to said decoded and delayed information for distributing the component under test into a discrete area representative of the coded category, said means including a cyclically rotated indexing wheel for conveying the successive components to be measured to a test station, and then successively conveying said components to a plurality of eject stations equal in number to at least the number of sorting categories employed, each of said eject stations associated with one of said discrete categories having a solenoid-actuated air tube associated therewith and being responsive to different signals from said decoding and storing means, each of said air tubes thereby ejecting any particular component respectively indexed thereto into a sorting area representative of the previously ascertained category for that component.

2. Apparatus of the type for ascertaining the appropriate one of a plurality of discrete categories, each defined by different minimum and maximum unit limits of a predetermined parameter, into which a component exhibiting a given measured number of said parameter units falls, and for distributing said component into the selected one of a plurality of sorting areas respectively corresponding in number and association with said chosen category, said apparatus comprising:
- a measuring circuit providing a binary encoded measurement indicative of the number of said predetermined parameter units exhibited by said component being measured, said binary encoded measurement also being indicative of the category into which the measured component falls,
- means for decoding said binary information and for storing said decoded information for a predetermined period of delay dependent upon the category defined by said decoded information, and
- means responsive to said decoded and delayed information for distributing the particular component under measurement into a sorting area representative of the previously ascertained category,
- wherein, said measuring circuit comprises an A.-C. voltage balancing bridge and a digital control unit, said control unit selectively inserting at least one of a plurality of predetermined increments each having a different number of the parameter units being measured into a balancing arm of said bridge, said increments being selected such that the bridge will balance to within the number of units in the smallest increment and will have at least a balancing range of $2^n$, where $n$ is the number of separate graduated increments employed for selective insertion into the balancing bridge arm.

3. Apparatus of the type for measuring a predetermined electrical parameter of and sorting electrical components into a plurality of discrete categories, each defined by maximum and minimum parameter unit limits, said apparatus comprising:
- a measuring circuit which provides a binary encoded measured reading defining the category into which the measured component under test should be sorted,
- means for decoding said binary information and storing it for a predetermined period of delay dependent upon the category defined by the encoded information, and
- means responsive to said stored and delayed information for distributing the component under test into a discrete sorting area corresponding to the previously ascertained and encoded category of said measured component, said last-mentioned means including a cyclically rotated indexing wheel for conveying the successive components to be measured to a test station, and then successively conveying said components to a plurality of eject positions equal in number to at least the number of sorting categories employed, each of said eject positions associated with a category having maximum and minimum limits having a solenoid-actuated air tube associated therewith and being responsive to different signals from said decording and storing means, each of said air tubes thereby ejecting any particular component respectively indexed thereto into a sorting area representative of the previously ascertained category for that component,
- wherein, said measuring circuit comprises an A.-C. voltage balancing bridge and a digital control unit, said control unit selectively inserting at least one of a plurality of predetermined increments each having a different number of the parameter units being measured into a balancing arm of said bridge, said increments being selected such that the bridge will balance to within the number of units in the smallest increment and will have at least a balancing range of $2^n$, where $n$ is the number of separate graduated increments employed for selective insertion into the balancing bridge arm.

4. In a testing system of the type for measuring a predetermined electrical parameter of and sorting electrical components into a plurality of discrete sorting categories, each defined by maximum and minimum parameter unit limits,
- apparatus for loading components successively onto a cyclical indexing mechanism at a load station, said mechanism in advancing through a series of index steps carrying said components successively from the load station to a test station, and then to a plurality of spaced eject stations, each of said eject stations being associated with a different one of said discrete sorting categories,
- measuring means providing a signal measurement indicative of the approximate number of said predetermined parameter units exhibited by said component being measured, said signal also being indicative of the category into which the measured component falls,
- a plurality of eject means respectively associated with each of said eject stations,
- a plurality of receiving means respectively associated with said eject means, and
- means in response to each of said signal measurements for operating the appropriate one of said eject means after a particular component under measurement has been indexed thereto, said component thereby being deposited in the appropriate receiving means associated with the previously ascertained category,
- wherein, said measuring means comprises an A.-C. voltage balancing bridge and a digital control unit, said control unit selectively inserting at least one of a plurality of predetermined increments each having a different number of parameter units being measured into a balancing arm of said bridge, said increments being selected such that the bridge will balance to within the number of units in the smallest increment and will have at least a balancing range of $2^n$ power, where $n$ is the number of separate graduated increments employed for selective insertion into the balancing bridge arm, and
- wherein said means in response to each of said signal measurements comprises a memory unit supplied with binary encoded signals from said digital control unit, said signals being representative of the measured categories into which the successively measured components fall, said memory unit decoding said binary encoded signals and storing the decoded signals for specific periods of delay, respectively, the period of delay for each decoded signal being commensurate with the time required for said indexing mechanism to carry each component from the test station to the appropriate one of said plurality of eject stations matched with the measured category for each component, said memory unit thereafter supplying a sort signal to actuate the proper one of said eject means.

5. Apparatus in accordance with claim 4 wherein said cyclical indexing mechanism comprises a rotatable indexing wheel having a plurality of component-receiving bores circumferentially spaced near the periphery thereof, and wherein said eject means comprises a different solenoid-controlled air tube adjacent each of said eject stations associated with a different one of said discrete sorting categories, said solenoid-controlled air tubes being positioned on the side of said indexing wheel opposite said receiving means respectively associated with said eject stations.

6. Apparatus of the type for measuring and sorting resistors into a plurality of discrete categories, each defined by maximum and minimum resistance limits, said apparatus comprising:

a measuring circuit including a voltage balancing A.-C. bridge, means for energizing said bridge, digital control means for selectively inserting a plurality of resistance increments, each having a different number of resistance units, into one arm of said bridge to balance out the number of resistance units exhibited by the resistor under test, said digital control means including means for translating the measured number of resistance units exhibited by said resistor under test into a binary encoded signal, memory means connected to said digital control means and responsive to said binary encoded signal, said memory means including means to decode and then delay the subsequent use of said decoded signal information, the period of delay being dependent upon the resistance category defined by said signal, and means responsive to said decoded and delayed information for distributing the resistor under test into a discrete sorting bin representative of the category associated with the measured value of resistance, said means including a cyclically rotated indexing wheel for conveying the successive resistors to be measured to a test station, and then successively conveying said resistors to plurality of eject stations equal in number to at least the number of discrete resistance sorting categories employed, each of said last-mentioned eject stations having a separate solenoid-controlled air tube associated therewith and being responsive to different signals from said decoding and storing means, each of said air tubes thereby ejecting any particular resistor respectively indexed thereto into the sorting bin representative of the previously ascertained category for that resistor.

7. Apparatus in accordance with claim 6 wherein said digital control means further includes four control relays for sequentially and respectively inserting four predetermined and graduated increments of resistance into the balancing arm of said bridge, said control relays being operated in response to logic elements in said digital control means such that the bridge will balance to within the number of resistance units in the smallest increment and will have at least a balancing range of $2^n$, where $n$ is the number of separate graduated increments of resistance employed for selective insertion into the balancing bridge arm.

8. Apparatus in accordance with claim 6 wherein said memory means includes a diode switching matrix for decoding said binary encoded signals, matrix comprising a plurality of diode banks, said banks equaling at least the number of said discrete resistance categories having minimum and maximum resistance limits, and with each bank having associated therewith a number of switching diodes equal to the number of increments of resistance to be selectively inserted into the balancing arm of the bridge, said matrix decoding the successive binary encoded resistance measurements applied thereto into single output pulses successively and numerically related to the appropriate resistance categories.

9. Apparatus in accordance with claim 8 wherein said memory unit further comprises a delay network including a plurality of rotary stepping switches, each of said switches having at least one group of contacts equal in number to the number of discrete sorting categories, each of said switches further comprising a set of three contact arms for each category associated therewith, means for connecting the output of each bank of said diode matrix to the advanced arm of the three-arm set associated with the corresponding category, a plurality of trigger-responsive control means respectively connected to the contacts in each of said groups of contacts, said switch contacts of each group and the respective sets of arms associated therewith being wired to said control means such that the three arms in each set when successively advanced to a given contact, and when the advanced arm of that set is supplied with a decoded signal from said diode matrix, will trigger a given one of said control means, supply a sort signal after a predetermined period of delay to relay sorting means to actuate the appropriate eject solenoid, and finally extinguish conduction of the triggered control means connected to said given contact, said predetermined period of delay corresponding to the period of time necessary for said indexing wheel to carry a particular resistor from the test station to the proper eject station corresponding to the measured resistance category.

10. Apparatus in accordance with claim 9 wherein each of said control means comprises a silicon controlled rectifier and wherein the second and third contact arms of each set associated with a given triggered rectifier in the order of rotation successively and respectively complete an anode circuit for the sort signal and a cathode-anode short circuit to extinguish conduction of the rectifier.

11. Apparatus of the type for measuring and sorting resistors into a plurality of discrete categories, each defined by maximum and minimum resistance limits, said apparatus comprising:

a measuring circuit including a voltage balancing A.-C. bridge, means for energizing said bridge, digital control means for selectively inserting a plurality of resistance increments, each having a different number of resistance units, into one arm of said bridge to balance out the number of resistance units exhibited by the resistor under test, said digital control means including four control relays for sequentially and respectively inserting four of said increments into said bridge, said control relays being operated in response to logic elements in said digital control means such that the bridge will balance to within the number of resistance units in the smallest of said four increments and will have at least a balancing range of $2^n$, where $n$ is the number of increments of resistance, said digital control means further including means for translating the measured number of resistance units exhibited by said resistors under test into a binary encoded signal, memory means connected to said digital control means and responsive to said binary encoded signal, said memory means including means to decode and then delay the subsequent use of said decoded signal information, the period of delay being dependent upon the resistance category defined by said signal, and means responsive to said decoded and delayed information for distributing the resistor under test into a discrete sorting bin representative of the category associated with the measured value of resistance, said means including a cyclically rotated indexing wheel for conveying the successive resistors to be measured to a test station, and then successively conveying said resistors to a plurality of eject stations equal in number to at least the number of discrete resistance sorting categories employed, each of said last-mentioned eject stations having a separate solenoid-controlled air tube associated therewith and being responsive to different signals from said decoding and storing means, each of said air tubes thereby ejecting any particular resistor respectively indexed thereto into the sorting bin representative of the previously ascertained category for that resistor.

12. Apparatus in accordance with claim 11 wherein said cyclically rotated indexing wheel has a plurality of resistor-receiving bores circumferentially spaced near the periphery thereof, and wherein said means responsive to said decoded and delayed information further comprises a drive motor, a drive shaft, and a Geneva drive coupled to said drive shaft, for imparting the desired rate of cyclical rotation to said wheel, and wherein a cam shaft is coupled to said drive shaft and continuously rotated at a predetermined rate, and wherein at least one cam is mounted on said cam shaft and is so constructed and disposed as to operate circuitry for supplying voltages to said relays and said solenoids when an electrical path is completed thereto by said digital control means and said memory means.

13. Apparatus of the type for measuring the inductance of and sorting components exhibiting both resistance and inductance into a plurality of discrete categories, each defined by maximum and minimum inductance limits, said apparatus comprising:

a measuring circuit including a voltage balancing A.-C. bridge, means for energizing said bridge, digital control means for selectively inserting a plurality of resistance and capacitance increments into one arm of said bridge to balance out the number of resistance and inductance units exhibited by the component under test, all of the increments associated with capacitance and resistance respectively having graduated unit values, said digital control means further including means for translating the measured number of inductance units exhibited by said component under test into a binary encoded signal, memory means connected to said digital control means and responsive to said binary encoded signal, said memory means including means to decode and then delay the subsequent use of said decoded signal information, the period of delay being dependent upon the inductance category defined by said signal, and means responsive to said decoded and delayed information for distributing the component under test into a discrete sorting bin representative of the category associated with the measured value of inductance, said means including a cyclically rotated indexing wheel for conveying the successive components to be measured to a test station, and then successively conveying said components to a plurality of eject stations equal in number to at least the number of discrete inductance sorting categories employed, each of said last-mentioned eject stations having a separate solenoid-controlled air tube associated therewith and being responsive to different signals from said decoding and storing means, each of said air tubes thereby ejecting any particular component respectively indexed thereto into the sorting bin representative of the previously ascertained category for that component.

14. Apparatus in accordance with claim 13 wherein said digital control means further includes eight control relays for sequentially and respectively inserting said eight predetermined and graduated increments of resistance and of capacitance into the balancing arm of said bridge, said control relays being operated in response to logic elements in said digital control means such that the bridge will balance to within the number of resistance units and capacitance units respectively in the smallest corresponding increment and will have at least a balancing range of $2^n$, where $n$ is the number of separate graduated increments of resistance and of capacitance employed for sequential insertion into the balancing bridge arm.

15. Apparatus in accordance with claim 13 wherein said memory means includes a diode switching matrix for decoding said binary encoded signals, said matrix comprising a plurality of diode banks, said banks equaling at least the number of said discrete categories having minimum and maximum impedance limits, and with each bank having associated therewith a number of switching diodes equal to the number of increments of capacitance to be selectively inserted into the balancing arm of the bridge, said matrix decoding the successive binary encoded inductance measurements applied thereto into single output pulses successively and numerically related to the appropriate impedance categories.

16. Apparatus in accordance with claim 15 wherein said memory unit further comprises a delay network including a plurality of rotary stepping switches, each of said switches having at least one group of contacts equal in number to the number of discrete sorting categories, each of said switches further comprising a set of three contact arms for each category associated therewith, means for connecting the output of each bank of said diode matrix to the advanced arm of the three-arm set associated with the corresponding category, a plurality of trigger-responsive control means respectively connected to the contacts in each of said groups of contacts, said switch contacts of each group and the respective sets of arms associated therewith being wired to said control means such that the three arms in each set when successively advanced to a given contact, and when the advanced arm of that set is supplied with a decoded signal from said diode matrix, will trigger a given one of said control means, supply a sort signal after a predetermined period of delay to relay sorting means to actuate the appropriate eject solenoid, and finally extinguish conduction of the triggered control means connected to said given contact, said predetermined period of delay corresponding to the period of time necessary for said indexing wheel to convey a particular component from the test station to the proper eject station corresponding to the measured and ascertained inductance category.

17. Apparatus in accordance with claim 16 wherein each of said control means comprises a silicon controlled rectifier and wherein the second and third contact arms of each set associated with a given triggered rectifier in the order of rotation successively and respectively complete an anode circuit for the sort signal and a cathode-anode short circuit to extinguish conduction of the rectifier.

18. Apparatus of the type for measuring the inductance of and sorting components exhibiting both resistance and inductance into a plurality of discrete categories, each defined by maximum and minimum inductance limits, said apparatus comprising:

a measuring circuit including a voltage balancing A.-C. bridge, means for energizing said bridge, digital control means for selectively inserting a plurality of resistance and capacitance increments into one arm of said bridge to balance out the number of resistance and inductance units exhibited by the component under test, all of the increments associated with capacitance and resistance respectively having graduated unit values, said digital control means including eight control relays for sequentially and respectively inserting said eight predetermined and graduated increments of resistance and of capacitance into the balancing arm of said bridge, said control relays being operated in response to logic elements in said digital control means such that the bridge will balance to within the number of resistance units and capacitance units respectively in the smallest corresponding increment and will have at least a balancing range of $2^n$, where $n$ is the number of separate graduated increments of resistance and of capacitance employed for sequential insertion into the balancing bridge arm, said digital control means further including means for translating the measured number of inductance units exhibited by said component under test into a binary encoded signal, memory means connected to said digital control means and responsive to said binary encoded signal, said memory means including means to decode and then delay the subsequent use of said decoded signal information, the period of delay being dependent upon the inductance category defined by said signal, and means responsive to said decoded and delayed information for distributing the component under test into a discrete sorting bin representative of the category associated with the measured value of inductance, said means including a cyclically rotated indexing wheel for conveying the successive components to be measured to a test station, and then successively conveying said components to a plurality of eject stations equal in number to at least the number of discrete inductance sorting categories employed, each of said last-mentioned eject stations having a separate solenoid-controlled air tube associated therewith and being responsive to different signals from said decoding and storing means, each of said air tubes thereby ejecting any particular component respectively indexed thereto into the sorting bin representative of the previously ascertained category for that component.

19. Apparatus in accordance with claim 18 wherein said cyclically rotated indexing wheel has a plurality of component-receiving bores circumferentially spaced near the periphery thereof, and wherein said means responsive to said decoded and delayed information further comprises a drive motor, a drive shaft, and a Geneva drive coupled to said drive shaft for imparting the desired rate of cyclical rotation to said wheel, and wherein a cam shaft is coupled to said drive shaft and continuously rotated at a predetermined rate, and wherein at least one cam is mounted on said cam shaft and is so constructed and disposed as to operate circuitry for supplying voltages to said relays and said solenoids when an electrical path is completed thereto by said digital control means and said memory means.

20. In combination with apparatus of the type wherein a series of components are successively applied to and carried by a cyclically indexed mechanism at a loading station and then successively advanced through a series of index steps to a plurality of predetermined and fixed index locations relative to said mechanism, measuring means including an A.-C. bridge circuit for automatically inserting successive components into one arm of said bridge circuit when indexed to a test station, digital control means responsive to output signals from said bridge for in turn operating circuitry for selectively inserting a plurality of predetermined parameter increments into one arm of said bridge to balance out the number of parameter units exhibited by the component under test, each of said increments having a different number of parameter units, said digital control means including means for translating the measured number of parameter units exhibited by each component under test into a binary encoded signal associated with a given one of a plurality of discrete sorting categories, each defined by maximum and minimum parameter unit limits, memory means connected to said digital control means and responsive to said binary encoded signal, said memory means including means to decode and then delay the subsequent use of said decoded signal information, the period of delay being dependent upon the resistance category defined by said signal, and means responsive to said decoded and delayed information for distributing the component under test into a discrete sorting bin representative of the category associated with the measured value of said predetermined parameter.

21. Apparatus in accordance with claim 20 wherein said memory means includes a diode switching matrix for decoding said binary encoded signals, said matrix comprising a plurality of diode banks, said banks equaling at least the number of said discrete parameter categories having minimum and maximum resistance limits and with each bank having associated therewith a number of switching diodes equal to the number of increments of said predetermined parameter to be selectively inserted into the balancing arm of the bridge, said matrix decoding the successive binary encoded parameter measurements applied thereto into single output pulses successively and numerically related to the appropriate parameter categories.

22. Apparatus in accordance with claim 20 wherein said memory means further comprises a delay network including a plurality of rotary stepping switches, each of said switches having at least one group of contacts equal in number to the number of discrete sorting categories, each of said switches further comprising a set of three contact arms for each category associated therewith, means for connecting the output of each bank of said diode matrix to the advanced arm of the three-arm set associated with the corresponding category, a plurality of trigger-responsive control means respectively connected to the contacts in each of said groups of contacts, said switch contacts of each group and the respective sets of arms associated therewith being wired to said control means such that the three arms in each set when successively advanced to a given contact, and when the advanced arm of that set supplied with a measurement signal from said digital control means, will trigger a given one of said control means, supply a sort signal to the distributing means after a predetermined period of delay commensurate with the category defined by said signal, and finally extinguish conduction of the triggered control means connected to said given contact, said predetermined period of delay corresponding to the period of time necessary for said indexing mechanism to convey a particular component from the test station to the proper index location corresponding to the measured parameter category.

23. Apparatus in accordance with claim 22 wherein said distributing means includes relay sorting means connected to said control means and responsive to the conduction thereof for operating a solenoid of and in turn an air valve associated with an appropriate one of a plurality of solenoid-actuated air tubes poistioned in alignment with the correspondingly related index locations such that each component carried by the indexing mechanism will be blown into a sorting bin associated with the measured category for that particular tested component.

References Cited by the Examiner
UNITED STATES PATENTS 2,690,258  9/54  Cox.
3,003,630  10/61  Brown _____ 209—81
3,032,191  5/62  Clukey _____ 209—81 X
3,065,414  11/62  Sears.

M. HENSON WOOD, JR., *Primary Examiner.*

ROBERT B. REEVES, *Examiner.*